(12) United States Patent
Zhuang et al.

(10) Patent No.: US 12,301,441 B2
(45) Date of Patent: May 13, 2025

(54) METHOD AND APPARATUS FOR UPDATING ROUTE INFORMATION, COMPUTER DEVICE, AND STORAGE MEDIUM

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN); Gang Yan, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 374 days.

(21) Appl. No.: 17/852,714

(22) Filed: Jun. 29, 2022

(65) Prior Publication Data
US 2022/0329512 A1    Oct. 13, 2022

Related U.S. Application Data

(63) Continuation of application No. PCT/CN2020/116595, filed on Sep. 21, 2020.

(30) Foreign Application Priority Data

Dec. 30, 2019   (CN) .......................... 201911398988.0

(51) Int. Cl.
H04L 45/02   (2022.01)
H04L 45/00   (2022.01)
H04L 45/033   (2022.01)

(52) U.S. Cl.
CPC ............ *H04L 45/04* (2013.01); *H04L 45/033* (2022.05); *H04L 45/70* (2013.01)

(58) Field of Classification Search
CPC ........ H04L 45/04; H04L 45/70; H04L 45/033
See application file for complete search history.

(56) References Cited

U.S. PATENT DOCUMENTS

| 10,630,582 B1* | 4/2020 | Deb ........................ H04L 45/04 |
| 2012/0099440 A1 | 4/2012 | Dong et al. |
| 2021/0160163 A1* | 5/2021 | Gray ........................ H04L 69/22 |

FOREIGN PATENT DOCUMENTS

| CN | 106161256 A | 11/2016 |
| CN | 106487709 A | 3/2017 |

(Continued)

OTHER PUBLICATIONS

"Internet Assigned Numbers Authority," https://www.iana.org/assignments/address-family-numbers/address-family-numbers.txt, 2013, 1 page.

(Continued)

*Primary Examiner* — Charles C Jiang
*Assistant Examiner* — Shawn D Miller
(74) *Attorney, Agent, or Firm* — Conley Rose, P.C.

(57) ABSTRACT

A method for updating route information includes a monitored network element establishes a Border Gateway Protocol (BGP) Monitoring Protocol (BMP) connection to a monitoring network element, and sends a first message to the monitoring network element when detecting a synchronization requirement of BGP route information, where the first message instructs the monitoring network element to update a BGP route information set, and the BGP route information set includes at least one piece of BGP route information. The first message indicates an update set, and the update set updates the BGP route information set.

20 Claims, 17 Drawing Sheets

(56) References Cited

FOREIGN PATENT DOCUMENTS

| | | |
|---|---|---|
| CN | 110191059 A | 8/2019 |
| EP | 3051758 A1 | 8/2016 |

OTHER PUBLICATIONS

P. Lucente, "TLV support for BMP Route Monitoring and Peer Down Messages," draft-ietf-grow-bmp-tlv-00, Sep. 3, 2019, 6 pages.
F. Xu, et al, "BGP Route Policy and Attribute Trace Using BMP," draft-xu-grow-bmp-route-policy-attr-trace-03, Nov. 2019, 15 pages.
"Internet Assigned Numbers Authority," https://www.iana.org/assignments/safi-namespace/safi-namespace.txt, 2000, 1 page.
Y. Rekhter, Ed., et al, "A Border Gateway Protocol 4 (BGP-4)," RFC 4271, Jan. 2006, 104 pages.
P. Marques, "Dissemination of Flow Specification Rules," RFC 5575, Aug. 2009, 22 pages.
Paolo Lucente, et al, "Future-proofing BMP," draft-lucente-grow-bmp-tlv, IETF, Grow Working Group, Jul. 24, 2019, 8 pages.
J. Scudder Ed., et al, "BGP Monitoring Protocol (BMP)," RFC 7854, Jun. 2016, 27 pages.

\* cited by examiner

METHOD AND APPARATUS FOR UPDATING ROUTE INFORMATION, COMPUTER DEVICE, AND STORAGE MEDIUM

CROSS-REFERENCE TO RELATED APPLICATIONS

This is a continuation of International Patent Application No. PCT/CN2020/116595 filed on Sep. 21, 2020, which claims priority to Chinese Patent Application No. 201911398988.0 filed on Dec. 30, 2019. The disclosures of the aforementioned applications are hereby incorporated by reference in their entireties.

TECHNICAL FIELD

This application relates to the field of network communication technologies, and in particular, to a method and apparatus for updating route information, a computer device, and a storage medium.

BACKGROUND

In a network, in a traffic optimization scenario or a scenario that relies on real-time route information, Border Gateway Protocol (BGP) route information of a network element in the network generally needs to be obtained. Therefore, obtaining the BGP route information is particularly important.

In a related technology, a monitoring network element monitors a network element in a network by using the BGP Monitoring Protocol (BMP). Further, a monitored network element establishes a Transmission Control Protocol (TCP) connection to the monitoring network element, and the monitored network element sends BMP initiation information to the monitoring network element. Then, the monitored network element sends, to the monitoring network element, a message indicating establishment of a connection to a BGP peer, and the monitored network element sends a route monitoring message to the monitoring network element (including all BGP route information received from the peer), and sends newly added route information or withdrawn BGP route information to the monitoring network element at any time.

Packets may be lost when the monitored network element sends BGP route information to the monitoring network element. Therefore, the BGP route information on the monitoring network element may be invalid BGP route information. As a result, packets are lost when the BGP route information is used.

SUMMARY

Embodiments of this application provide a method and apparatus for updating route information, a computer device, and a storage medium. According to this application, a packet loss probability can be reduced.

According to a first aspect, a method for updating route information is provided, applied to a monitored network element, and the method includes the following.

The monitored network element establishes a BMP connection to a monitoring network element, and sends a first message to the monitoring network element when detecting a synchronization requirement of BGP route information, where the first message is used to indicate the monitoring network element to update a BGP route information set, and the BGP route information set includes at least one piece of BGP route information. The first message is further used to indicate an update set, and the update set is used to update the BGP route information set.

In the solution shown in this application, the monitored network element may establish the BMP connection to the monitoring network element, and the monitored network element may detect whether the synchronization requirement of the BGP route information is met. When the synchronization requirement of the BGP route information is met, (for example, during preset duration after the BMP connection is established), the monitored network element may generate a first message, where the first message is used to indicate the monitoring network element to update the BGP route information set, the first message is further used to indicate the update set, and the update set is used to update the BGP route information set. Then, the monitored network element sends the first message to the monitoring network element.

In this way, because the monitoring network element may be indicated by using the first message to update the BGP route information set, BGP route information on the monitoring network element may be synchronized in time, to further reduce packet loss.

In a possible implementation, the update set includes at least one piece of BGP route information, or the update set is empty.

In this way, when the update set is empty, the monitoring network element may be indicated to delete the BGP route information set.

In a possible implementation, the method further includes the following. The monitored network element sends at least one route monitoring message to the monitoring network element, where BGP route information included in the at least one piece of route monitoring information is used to form the update set.

In the solution shown in this application, the monitored network element may send at least one route monitoring message to the monitoring network element. After receiving the at least one route monitoring message, the monitoring network element may form the update set by using the BGP route information in the at least one route monitoring message, so as to update the BGP route information set. In this way, the BGP route information set may be updated in batches.

In a possible implementation, the first message is further used to indicate a start point of the update set. After sending the at least one route monitoring message to the monitoring network element, the monitored network element sends a second message to the monitoring network element, where the second message is used to indicate an end point of the update set.

In the solution shown in this application, the first message is further used to indicate the start point of the update set. For example, a timestamp of the first message is the start point of the update set. After the monitored network element sends the at least one route monitoring message to the monitoring network element, the monitored network element may send the second message to the monitoring network element, where the second message is used to indicate the end point of the update set. For example, a timestamp of the second message is the end point of the update set. In this way, the monitored network element may indicate which BGP route information in the route monitoring message sent to the monitoring network element is used to update the BGP route information set.

In a possible implementation, the first message includes a BGP peer address, an address family identifier, and a subsequent address family identifier, and the BGP route information set is determined by using the BGP peer address, the address family identifier, and the subsequent address family identifier. In this way, the BGP route information to be updated on the monitoring network element can be specified.

In a possible implementation, the first message further includes a target route information type, and the target route information type is used to indicate one or more route information types in one or more route information types indicated by the address family identifier and the subsequent address family identifier. The BGP route information set is determined based on the BGP peer address, the address family identifier, the subsequent address family identifier, and the target route information type. In this way, only BGP route information of some route information types indicated by the address family identifier and the subsequent address family identifier may be updated.

In a possible implementation, the first message further includes a route policy identifier of each route information type in the target route information type, and the route policy identifier is used to indicate a manner of selecting the BGP route information included in the at least one route monitoring message. The BGP route information set is determined based on the BGP peer address, the address family identifier, the subsequent address family identifier, the target route information type, and the route policy identifier of each route information type. In this way, some BGP route information can be updated based on route policies.

In a possible implementation, the first message further includes a priority of each route information type in the target route information type. The BGP route information set is determined based on the BGP peer address, the address family identifier, the subsequent address family identifier, the target route information type, and the priority of each route information type. In this way, high-priority BGP route information can be updated preferentially.

In a possible implementation, when a BMP monitoring instruction sent by the monitoring network element is received, it is determined that the synchronization requirement of the BGP route information is detected, and the first message is sent to the monitoring network element.

In the solution shown in this application, the monitored network element receives the BMP monitoring instruction sent by the monitoring network element, determines that the synchronization requirement of the BGP route information is detected, and may send the first message to the monitoring network element. In this way, the monitoring network element may indicate to update the BGP route information. This is more flexible.

In a possible implementation, the BMP monitoring instruction includes the BGP peer address, the address family identifier, and the subsequent address family identifier. The monitored network element adds the BGP peer address, the address family identifier, and the subsequent address family identifier that are included in the BMP monitoring instruction to the first message, and determines the BGP route information included in the at least one route monitoring message based on the BGP peer address, the address family identifier, and the subsequent address family identifier that are included in the BMP monitoring instruction.

In the solution shown in this application, the BMP instruction may include the BGP peer address, the address family identifier, and the subsequent address family identifier, and the monitored network element may add the BGP peer address, the address family identifier, and the subsequent address family identifier to the first message. In addition, the monitored network element may determine all BGP route information under the BGP peer address, and then determine, in the BGP route information, BGP route information indicated by the address family identifier and the subsequent address family identifier. The BGP route information is the BGP route information included in the at least one route monitoring message. In this way, the monitored network element updates the BGP route information according to an indication of the monitoring network element.

In a possible implementation, the BMP monitoring instruction further includes the target route information type, and the target route information type included in the BMP monitoring instruction is used to indicate one or more route information types in one or more route information types indicated by the address family identifier and the subsequent address family identifier included in the BMP monitoring instruction. The target route information type included in the BMP monitoring instruction is added to the first message. The BGP route information included in the at least one route monitoring message is determined based on the BGP peer address, the address family identifier, the subsequent address family identifier, and the target route information type that are included in the BMP monitoring instruction.

In the solution shown in this application, the BMP instruction may further include the target route information type, and the target route information type is used to indicate the one or more route information types in the route information types indicated by the address family identifier and the subsequent address family identifier included in the BMP monitoring instruction. The monitored network element may determine all BGP route information under the BGP peer address, and then determine, in the BGP route information, the BGP route information indicated by the address family identifier and the subsequent address family identifier, and determine BGP route information indicated by the target route type in the BGP route information indicated by the address family identifier and the subsequent address family identifier, where the BGP route information indicated by the target route type is the BGP route information included in the at least one route monitoring message. In this way, only BGP route information indicated by some route types may be updated.

In a possible implementation, the BMP monitoring instruction further includes a route policy identifier of each route information type in the target route information type, and the route policy identifier is used to indicate a manner of selecting the BGP route information included in the at least one route monitoring message. The route policy identifier of each route information type included in the BMP monitoring instruction is added to the first message, and the BGP route information included in the at least one route monitoring message is determined based on the BGP peer address, the address family identifier, the subsequent address family identifier, the target route information type, and the route policy identifier of each route information type that are included in the BMP monitoring instruction.

In the solution shown in this application, the BMP instruction may further include the route policy identifier of each route information type in the target route information type, and a route policy is used to indicate the manner of selecting the BGP route information included in the at least one route monitoring message. The monitored network element may determine all BGP route information under the BGP peer address, and then determine, in the BGP route information, the BGP route information indicated by the address family identifier and the subsequent address family identifier, and determine BGP route information indicated by the target route information type in the BGP route information indicated by the address family identifier and the subsequent address family identifier. For each route information type in the target route information type, the monitored network element selects, according to a route policy indicated by the route information type, BGP route information from BGP route information indicated by the route information type, where the BGP route information selected under each route information type forms the BGP route information included in the at least one route monitoring message. In this way, the BGP route information can be updated according to the route policy. This is more flexible.

In a possible implementation, the BMP monitoring instruction further includes a priority of each route information type in the target route information type. The priority of each route information type included in the BMP monitoring instruction is added to the first message. The BGP route information included in the at least one route monitoring message is determined based on the BGP peer address, the address family identifier, the subsequent address family identifier, the target route information type, and the priority of each route information type that are included in the BMP monitoring instruction.

In the solution shown in this application, the BMP instruction may further include the priority of each route information type in the target route information type, and the priority is used to indicate BGP route information of which route information type is to be preferentially updated. The monitored network element may determine all BGP route information under the BGP peer address, and then determine, in the BGP route information, the BGP route information indicated by the address family identifier and the subsequent address family identifier, and determine BGP route information indicated by the target route information type in the BGP route information indicated by the address family identifier and the subsequent address family identifier. The monitored network element may add, in descending order of priorities, BGP route information indicated by route information types to the route monitoring message for sending. In this way, the BGP route information can be sent based on the priorities, and important BGP route information can be updated in time.

According to a second aspect, a method for updating route information is provided, applied to a monitoring network element, and the method includes the following. The monitoring network element establishes a BMP connection to a monitored network element, and receives a first message sent by the monitored network element, where the first message is used to indicate the monitoring network element to update a BGP route information set. The BGP route information set includes at least one piece of BGP route information, the update set is determined based on the first message, and update processing is performed on the BGP route information set based on the update set.

In the solution shown in this application, the monitoring network element may establish the BMP connection to the monitored network element, and based on the established BMP connection, the monitoring network element receives the first message sent by the monitored network element, where the first message is used to indicate the monitoring network element to update the BGP route information set. For example, the BGP route information set is BGP route information received from the monitored network element before a timestamp of the first message, and the BGP route information set includes the at least one piece of BGP route information. The monitoring network element may determine the update set by using the first message. For example, the monitoring network element may use a route monitoring message sent by the monitored network element within preset duration after the timestamp of the first message, and use BGP route information included in the route monitoring message to form the update set. Then, the monitoring network element may update the BGP route information set by using the update set. For example, the monitoring network element may store the BGP route information included in the update set, and delete the BGP route information from the BGP route information set. In this way, the monitored network element can update the BGP route information in time when a synchronization requirement is met, so that the monitored network element can obtain the latest BGP route information, thereby reducing a packet loss rate.

In a possible implementation, the update set includes at least one piece of BGP route information, or the update set is empty.

In a possible implementation, the monitoring network element receives at least one route monitoring message sent by the monitored network element, where BGP route information included in the at least one piece of route monitoring information is used to form the update set.

In this way, the monitoring network element may update the BGP route information set by using the BGP route information in the at least one route monitoring message.

In a possible implementation, the monitoring network element determines a start point of the update set based on the first message, receives a second message sent by the monitored network element, where the second message is used to indicate an end point of the update set, and determines the end point of the update set based on the second message.

In the solution shown in this application, the monitoring network element may determine the timestamp of the first message in the first message, and determine the timestamp as the start point of the update set. The monitoring network element may further receive the second message, determine a timestamp of the second message, and determine the timestamp as the end point of the update set. In this way, the monitored network element may clearly indicate the update set. This is more flexible.

In a possible implementation, the monitoring network element sends a BMP monitoring instruction to the monitored network element, where the BMP monitoring instruction is used to indicate that the monitored network element detects a synchronization requirement of the BGP route information.

In the solution shown in this application, when the monitoring network element detects that the BGP route information needs to be updated synchronously, the monitoring network element may indicate the monitored network element to update the BGP route information. In this way, when the monitoring network element needs to update the BGP route information synchronously, the monitoring network element may actively initiate updating the BGP route information. This is more flexible.

In a possible implementation, the monitoring network element determines a BGP peer address, an address family identifier, and a subsequent address family identifier based on specified BGP route information uploaded by the monitored network element, and adds the BGP peer address, the address family identifier, and the subsequent address family identifier to the BMP monitoring instruction.

In the solution shown in this application, the monitoring network element may determine the BGP peer address, the address family identifier, and the subsequent address family identifier based on the specified BGP route information uploaded by the monitored network element. The monitoring network element then adds the BGP peer address, the address family identifier, and the subsequent address family identifier to the BMP monitoring instruction. In this way, the monitoring network element may specify the BGP route information to be updated by the monitoring network element.

In a possible implementation, the monitoring network element determines a target route information type based on the specified BGP route information uploaded by the monitored network element, where the target route information type is used to indicate one or more route information types in one or more route information types indicated by the address family identifier and the subsequent address family identifier, and adds the target route information type to the BMP monitoring instruction.

In the solution shown in this application, the monitoring network element may further determine the target route information type in the address family identifier and the subsequent address family identifier by using the specified BGP route information uploaded by the monitored network element. The monitoring network element may then add the target route information type to the BMP monitoring instruction. In this way, the monitoring network element may specify to update only BGP route information of some route information types.

In a possible implementation, the monitoring network element determines, based on the specified BGP route information uploaded by the monitored network element, a route policy identifier corresponding to each route information type in the target route information type, and adds the route policy identifier corresponding to each route information type to the BMP monitoring instruction, and/or determines, based on the specified BGP route information uploaded by the monitored network element, a priority corresponding to each route information type in the target route information type, and adds the priority of each route information type to the BMP monitoring instruction.

In the solution shown in this application, the monitoring network element may determine, by using the specified BGP route information uploaded by the monitored network element, the route policy identifier corresponding to each route information type in the target route information type. For example, a route information type includes three pieces of BGP route information, and a route policy is a route prefix. The route prefix is used to match one piece of the BGP route information. Then the route policy identifier corresponding to each route information type is added to the BMP monitoring instruction. In this way, the monitoring network element can specify a route policy for updating the BGP route information.

The monitoring network element may further determine, by using the specified BGP route information uploaded by the monitored network element, the priority of each route type in the target route information type. For example, BGP route information with the highest current packet loss rate has the highest priority. The priority of each route information type is then added to the BMP monitoring instruction. In this way, the monitoring network element may indicate the monitored network element to preferentially upload high-priority BGP route information.

In a possible implementation, the first message includes the BGP peer address, the address family identifier, and the subsequent address family identifier. Before performing update processing on the BGP route information set based on the update set, the monitoring network element determines the BGP route information set based on the BGP peer address, the address family identifier, and the subsequent address family identifier that are included in the first message.

In the solution shown in this application, when the first message includes the BGP peer address, the address family identifier, and the subsequent address family identifier, the monitoring network element may determine all BGP route information under the BGP peer address, and then determine, in the BGP route information, BGP route information indicated by the address family identifier and the subsequent address family identifier, and the BGP route information forms the BGP route information set. In this way, the monitoring network element may determine the BGP route information set.

In a possible implementation, the first message further includes a target route information type, and the target route information type is used to indicate one or more route information types in one or more route information types indicated by the address family identifier and the subsequent address family identifier. The monitoring network element determines the BGP route information set based on the BGP peer address, the address family identifier, the subsequent address family identifier, and the target route information type that are included in the first message.

In the solution shown in this application, the monitoring network element may determine all BGP route information under the BGP peer address, and then determine, in the BGP route information, BGP route information indicated by the address family identifier and the subsequent address family identifier. In the BGP route information, BGP route information indicated by the target route information type is selected to form the BGP route information set. In this way, the monitoring network element may determine the BGP route information set.

In a possible implementation, the first message further includes a priority of each route information type in the target route information type. Update processing is performed on the BGP route information set based on BGP route information included in the update set and the priority of each route information type, where update time of BGP route information of a high-priority route information type is earlier than that of BGP route information of a low-priority route information type.

In the solution shown in this application, the monitoring network element may determine the priority of each route information type in the target route information type, and then determine a priority of the BGP route information based on the BGP route information included in the update set and the priority of each route information type. Then, update processing is performed on the BGP route information set sequentially in descending order of priorities. In this way, high-priority BGP route information can be updated preferentially.

In a possible implementation, the first message further includes a route policy identifier of each route information type in the target route information type. The monitoring network element determines the BGP route information set based on the BGP peer address, the address family identifier, the subsequent address family identifier, the target route information type, and the route policy identifier of each route information type that are included in the first message.

In the solution shown in this application, the monitoring network element may determine all BGP route information under the BGP peer address, and then determine, in the BGP route information, BGP route information indicated by the address family identifier and the subsequent address family identifier. In the BGP route information, the BGP route information indicated by the target route information type is selected. For each route information type in the target route information type, the monitoring network element may select BGP route information from BGP route information of the route information type by using a route policy corresponding to the route information type. In this way, the BGP route information selected according to the route policy corresponding to each route information type forms the BGP route information set. In this way, the monitoring network element may determine the BGP route information set.

In a possible implementation, after the second message sent by the monitored network element is received, deletion processing is performed on the BGP route information set, and the BGP route information included in the update set is stored, after the second message sent by the monitored network element is received, the BGP route information set is marked as unavailable route information, and the BGP route information included in the update set is stored, after the second message sent by the monitored network element is received, BGP route information that is in the BGP route information set and that does not exist in the update set is marked as unavailable route information or deletion processing is performed, and the BGP route information that is in the update set and that does not exist in the BGP route information set is stored, or before the second message sent by the monitored network element is received, BGP route information that is in the update set and that does not exist in the BGP route information set is stored, and after the second message sent by the monitored network element is received, the BGP route information that is in the BGP route information set and that does not exist in the update set is marked as unavailable route information or deletion processing is performed.

In the solution shown in this application, after receiving the second message sent by the monitored network element, the monitoring network element may perform deletion processing on the BGP route information set indicated by the first message, and store the BGP route information in the update set. In this way, only available BGP route information is stored. This can save storage space. Alternatively, after receiving the second message sent by the monitored network element, the monitoring network element marks the BGP route information set indicated by the first message as an unavailable route, and stores the BGP route information in the update set. In this way, the BGP route information can be stored, and new BGP route information can be obtained. Alternatively, after receiving the second message sent by the monitored network element, the monitoring network element determines BGP route information that is in the BGP route information set indicated by the first message and that is different from the update set, and determines the part of BGP route information as an unavailable route, or delete the part of BGP route information. The monitoring network element determines BGP route information that is in the update set and that is different from the BGP route information set indicated by the first message. The part of route information is BGP route information that is not synchronized in time, and the monitoring network element may store the part of BGP route information. BGP route information that is in the update set and that is the same as the BGP route information set is not processed. In this way, BGP route information stored by the monitoring network element is currently available BGP route information. Alternatively, after receiving the first message sent by the monitored network element and before receiving the second message, the monitoring network element performs update processing on the BGP route information set by using the BGP route information in the route monitoring message as long as the monitoring network element receives the route monitoring message. In this way, the monitoring network element can obtain the latest BGP route information in time. After receiving the second message sent by the monitored network element, the monitoring network element may perform deletion processing on the route information that is in the BGP route information set and that does not belong to the update set, or mark the BGP route information as unavailable. In this way, the monitoring network element can clear unavailable BGP route information in time.

According to a third aspect, this application provides an apparatus for updating route information, applied to a monitored network element. The apparatus includes a plurality of modules, and the plurality of modules implement the provided method for updating route information by executing instructions.

According to a fourth aspect, this application provides an apparatus for updating route information, applied to a monitoring network element. The apparatus includes a plurality of modules, and the plurality of modules implement the provided method for updating route information by executing instructions.

According to a fifth aspect, this application provides a computer device. The computer device includes a memory and a processor, and the processor executes computer instructions stored in the memory, so that the computer device performs the method according to the first aspect.

According to a sixth aspect, this application provides a computer device. The computer device includes a memory and a processor, and the processor executes computer instructions stored in the memory, so that the computer device performs the method according to the second aspect.

According to a seventh aspect, a computer-readable storage medium is provided, where the computer-readable storage medium stores computer instructions, and when the computer instructions in the computer-readable storage medium are executed by a computer device, the computer device is enabled to perform the method according to the first aspect, or the computer device is enabled to implement a function of the apparatus according to the third aspect.

According to an eighth aspect, a computer-readable storage medium is provided, where the computer-readable storage medium stores computer instructions, and when the computer instructions in the computer-readable storage medium are executed by a computer device, the computer device is enabled to perform the method according to the second aspect, or the computer device is enabled to implement a function of the apparatus according to the fourth aspect.

According to a ninth aspect, this application provides a computer program product, where the computer program product includes computer instructions, and when the computer instructions are executed by a computer device, the computer device performs the method according to the first aspect.

According to a tenth aspect, this application provides a computer program product, where the computer program product includes computer instructions, and when the computer instructions are executed by a computer device, the computer device performs the method according to the second aspect.

According to an eleventh aspect, a system for updating route information is provided, where the system includes a monitored network element and a monitoring network element. The monitored network element is the monitored network element according to the third aspect, and the monitoring network element is the monitoring network element according to the fourth aspect.

DESCRIPTION OF EMBODIMENTS

To make the objectives, technical solutions, and advantages of this application clearer, the following further describes implementations of this application in detail with reference to the accompanying drawings.

For ease of understanding of embodiments of this application, the following first describes concepts of terms used.

The BGP is an autonomous system route protocol running on TCP. The BGP is a route protocol used to exchange route information between different autonomous systems and used within a same autonomous system.

The BMP is a protocol that can monitor a BGP running status of a device on a network in real time. The BGP running status includes establishment and termination of a peer relationship and update of BGP route information.

An address family identifier (AFI) is used to distinguish different network layer protocols. For example, in an Internet Protocol (IP) network, an address family may include IP version 4 (IPv4), IP version 6 (IPv6), virtual private local area network (LAN) service (VPLS), and the like.

A subsequent address family identifier (SAFI) is used to distinguish different protocols of a network layer protocol with a same address family identifier.

A BGP peer may include an Internal BGP (IBGP) peer and an External BGP (EBGP) peer. Relative to local route devices, IBGP peers and the local route devices are located in a same autonomous system, and EBGP peers and the local route devices are located in different autonomous systems.

BMP messages include six types of messages: an initiation message, a peer up notification (PU) message, a route monitoring (RM) message, a peer down notification (PD) message, a statistics report (SR) message, and a termination message. The six types of messages each are sent in a packet form. Further, the initiation message is a BMP initiation message, used to notify a monitoring network element of vendor information, a version, and the like. The PU message is a message, reported to the monitoring network element, indicating establishment of a connection to a BGP peer. The RM message is a route monitoring message, used to send all the route information received from the BGP peer to the monitoring network element, and to report addition or withdrawal of route information to the monitoring network element at any time. The PD message is a message, reported to the monitoring network element, indicating interruption of the connection to the BGP peer. The SR message is a statistics report, reported to the monitoring network element, of a running status of a monitored network element. The termination message is a message used to send, to the monitoring network element, a reason for terminating the BMP connection.

Figure 1:
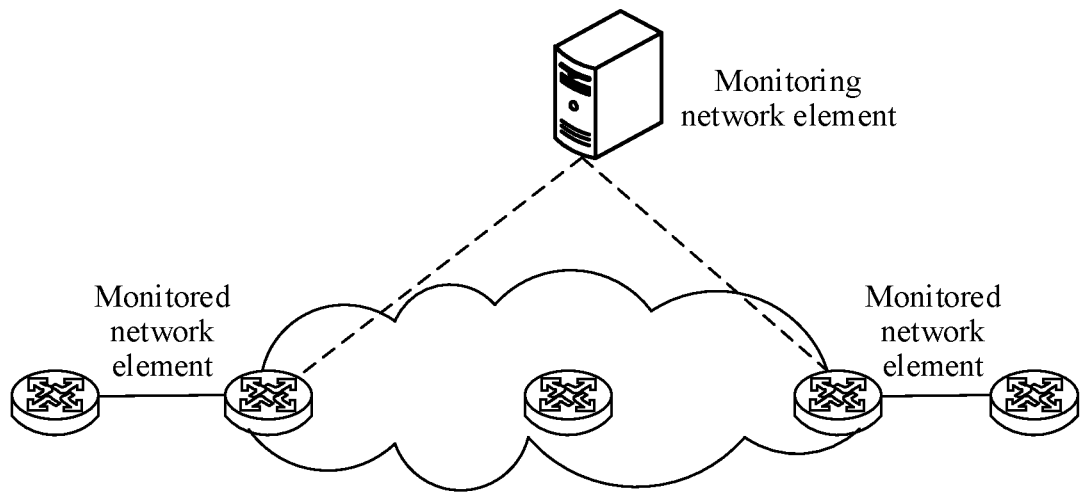
FIG. 1 is a schematic diagram of a scenario of updating route information according to an example embodiment of this application.

In a network, in a traffic optimization scenario or a scenario that relies on real-time route information, BGP route information of a network element on the network needs to be obtained. Before BMP is implemented, a BGP running status of the network element on the network can be obtained only through manual query. This is inefficient. As shown in FIG. 1, after BMP is implemented, a monitored network element establishes a connection to a monitoring network element, and sends a BGP running status of the monitored network element to the monitoring network element. This does not require manual acquisition and improves network monitoring efficiency. Further, after BMP is implemented, a BMP connection is established between the monitored network element and the monitoring network element to transmit a BMP message. The monitored network element first generates a BMP initiation message, and notifies a monitoring server of vendor information, a version, and the like of the monitored network element by using the BMP initiation message. Then, the monitored network element sends a PU message and all BGP route information received from a BGP peer to the monitoring network element, and after sending all the BGP route information, the monitored network element sends an end of routing information base (End-of-RIB) message to the monitoring network element, to notify the monitoring network element that batch sending of the BGP route information is ended. Subsequently, the monitored network element sends newly added BGP route information or withdrawn BGP route information to the monitoring network element at any time. When the monitored network element keeps running for a long time, packet loss may occur when the monitored network element sends BGP route information to the monitoring network element. Therefore, BGP route information on the monitoring network element may be invalid BGP route information. As a result, the BGP route information on the monitoring network element is not synchronized with the BGP route information on the monitored network element. Therefore, a method for updating BGP route information needs to be provided.

An embodiment of this application provides a method for updating route information. The method may be executed by a monitored network element or a monitoring network element. The monitored network element may be a software apparatus, or may be a hardware apparatus. When the monitored network element is a hardware apparatus, the monitored network element may be a router, a switch, or the like implemented by using hardware. When the monitored network element is a software apparatus, the monitored network element may be a router, a switch, or the like implemented by using software. The monitoring network element may be a software apparatus or a hardware apparatus. When the monitoring network element is a hardware apparatus, the monitoring network element may be a server, a computer device, a terminal, or the like. When the monitoring network element is a software apparatus, the software apparatus may be installed on a server, a computer device, or the like.

Figure 2:
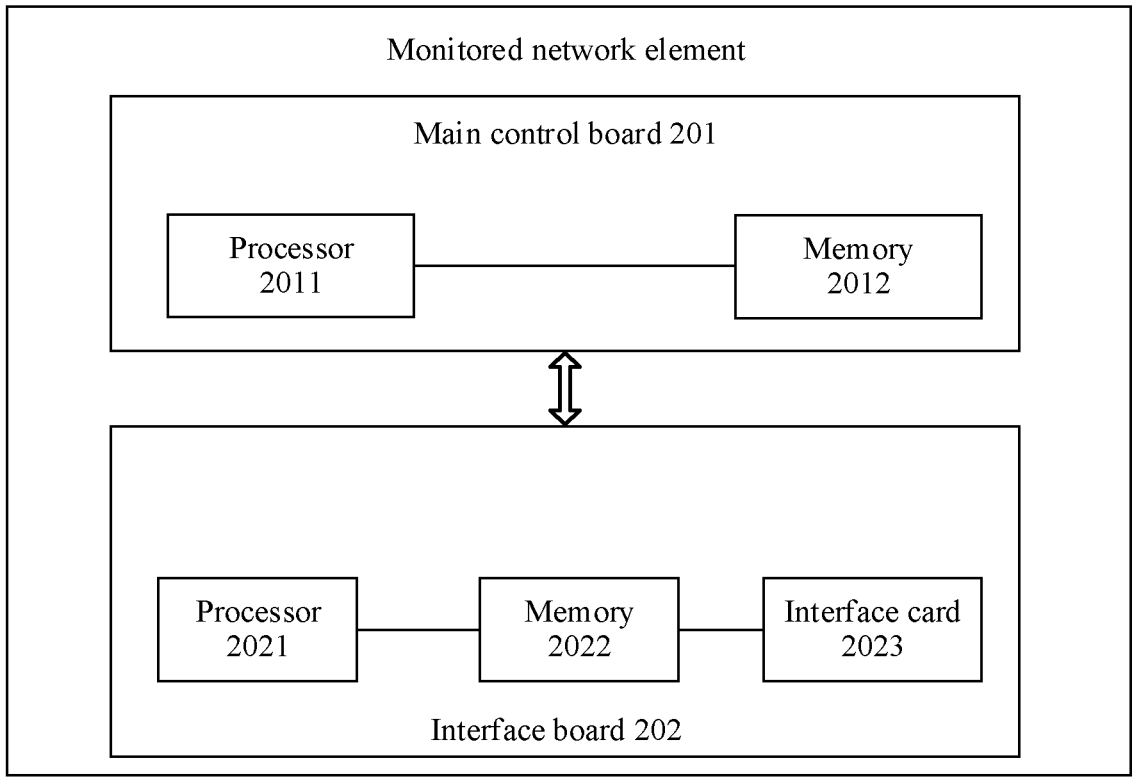
FIG. 2 is a schematic diagram of a structure of a monitored network element according to an example embodiment of this application.

When the monitored network element is a hardware apparatus, as shown in FIG. 2, a schematic diagram of a structure of a router or a switch is provided. The monitored network element includes a main control board 201 and an interface board 202. The main control board 201 includes a processor 2011 and a memory 2012. The interface board 202 includes a processor 2021, a memory 2022, and an interface card 2023. A communication connection is established between the main control board 201 and the interface board 202.

The processor 2011 may be a central processing unit (CPU), an application-specific integrated circuit (ASIC), or the like. The processor 2011 may include one or more chips. The memory 2012 may be a read-only memory (ROM), a static storage device, a dynamic storage device, or a random-access memory (RAM). The memory 2012 may store computer instructions. When the computer instructions stored in the memory 2012 are executed by the processor 2011, the processor 2011 executes the method for updating route information.

The processor 2021 may be a CPU, an ASIC, or the like. The processor 2021 may include one or more chips. The memory 2022 may be a ROM, a static storage device, a dynamic storage device, or a RAM. The memory 2022 may store computer instructions. When the computer instructions stored in the memory 2022 are executed by the processor 2021, the processor 2021 executes the method for updating route information. The interface card 2023 may implement packet receiving and sending processing.

Figure 3:
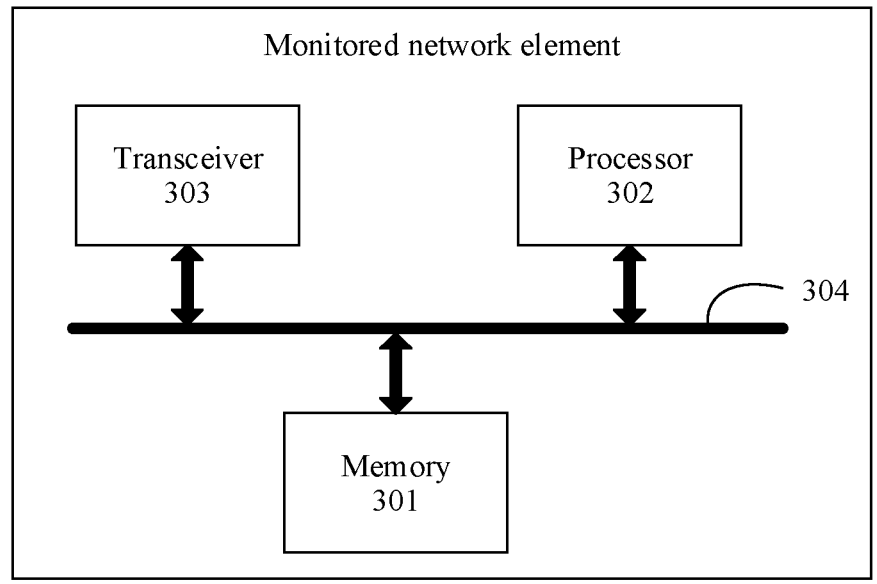
FIG. 3 is a schematic diagram of a structure of a monitored network element according to an example embodiment of this application.

When the monitored network element is a hardware apparatus, as shown in FIG. 3, another schematic diagram of a structure of a router or a switch is further provided. The monitored network element includes a memory 301, a processor 302, a transceiver 303, and a bus 304. The memory 301, the processor 302, and the transceiver 303 implement communication connection to each other by using the bus 304.

The memory 301 may be a ROM, a static storage device, a dynamic storage device, or a RAM. The memory 301 may store computer instructions. When the computer instructions stored in the memory 301 are executed by the processor 302, the processor 302 and the transceiver 303 are configured to perform the method for updating route information. The memory may further store data. For example, a part of the memory 301 is configured to store data required for the method for updating route information, and is configured to store intermediate data or result data in a program execution process.

The processor 302 may use a general-purpose CPU, an ASIC, a graphics processing unit (GPU), or any combination thereof. The processor 302 may include one or more chips.

The transceiver 303 uses a transceiver module such as but not limited to a transceiver, to implement communication between the monitored network element and another device or a communication network. For example, the transceiver 303 may obtain data required for updating route information.

The bus 304 may include a path for transmitting information between components (for example, the memory 301, the processor 302, and the transceiver 303) of the monitored network element.

Figure 4:
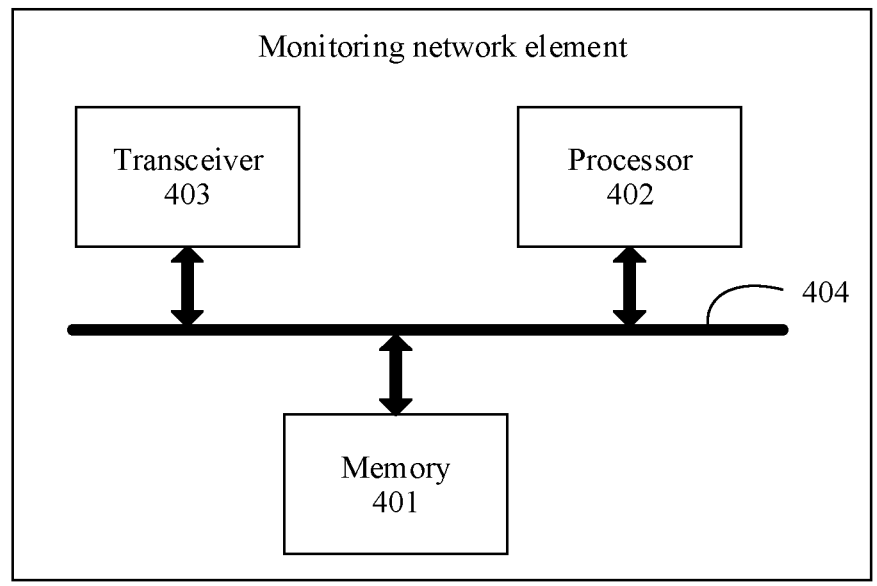
FIG. 4 is a schematic diagram of a structure of a monitoring network element according to an example embodiment of this application.

When the monitoring network element is a hardware apparatus, as shown in FIG. 4, a schematic diagram of a structure of a router or a switch is further provided. The monitoring network element includes a memory 401, a processor 402, a transceiver 403, and a bus 404. The memory 401, the processor 402, and the transceiver 403 implement communication connection to each other by using the bus 404.

The memory 401 may be a ROM, a static storage device, a dynamic storage device, or a RAM. The memory 401 may store computer instructions. When the computer instructions stored in the memory 401 are executed by the processor 402, the processor 402 and the transceiver 403 are configured to perform the method for updating route information. The memory may further store data. For example, a part of the memory 401 is configured to store data required for the method for updating route information, and is configured to store intermediate data or result data in a program execution process.

The processor 402 may use a general-purpose CPU, an ASIC, a graphics processing unit, or any combination thereof. The processor 402 may include one or more chips.

The transceiver 403 uses a transceiver module such as but not limited to a transceiver, to implement communication between the monitoring network element and another device or a communication network. For example, the transceiver 403 may obtain data required for updating route information.

The bus 404 may include a path for transmitting information between components (for example, the memory 401, the processor 402, and the transceiver 403) of the monitoring network element.

Before implementation, an application scenario of embodiments of this application is first described.

Scenario 1: The monitored network element periodically sends a first message to the monitoring network element based on configuration information of the monitored network element. The monitoring network element updates, based on the first message, a BGP route information set indicated by the first message.

Scenario 2: The monitoring network element sends a BMP monitoring instruction to the monitored network element based on a requirement of the monitoring network element, to indicate the monitored network element to report a first message to the monitoring network element. The monitoring network element updates, based on the first message, a BGP route information set indicated by the first message.

It should be noted that one monitored network element may synchronize BGP route information with only one monitoring network element, or may synchronize BGP route information with a plurality of monitoring network elements. This is not limited in embodiments of the present disclosure. The following describes an example in which one monitored network element synchronizes BGP route information with one monitoring network element.

Scenario 1 is used as an example. The monitored network element sends the first message to the monitoring network element, where an update set is empty. The monitored network element marks BGP route information in the BGP route information set indicated by the first message as unavailable route information or deletes the BGP route information. The following describes a procedure of the method for updating route information with reference to FIG. 5.

Step 501: A monitored network element establishes a BMP connection to a monitoring network element.

In this embodiment, after the monitored network element goes online, the monitored network element establishes the BMP connection to the monitoring network element over the TCP. After the monitored network element establishes the BMP connection to the monitoring network element, the monitored network element first generates a BMP initiation message, and notifies the monitoring network element of vendor information, a version, and the like of the monitored network element by using the BMP initiation message. Then, the monitored network element sends a PU message and all BGP route information received from a BGP peer to the monitoring network element, and after sending all the BGP route information, the monitored network element sends an end-of-RIB message to the monitoring network element, to notify the monitoring network element that batch sending of the BGP route information is ended. Subsequently, the monitored network element sends newly added BGP route information or withdrawn BGP route information to the monitoring network element at any time. Subsequently, the monitored network element checks whether there is a synchronization requirement of BGP route information.

Step 502: When detecting the synchronization requirement of the BGP route information, the monitored network element sends a first message to the monitoring network element.

The first message is used to indicate the monitoring network element to update a BGP route information set. The first message is further used to indicate an update set, and the update set is used to update the BGP route information set.

In this embodiment, a skilled person configures a synchronization requirement time point on the monitored network element, for example, moments at intervals of every first preset duration after the monitored network element establishes the BMP connection to the monitoring network element.

After the monitored network element establishes the BMP connection to the monitoring network element, the monitored network element may generate the first message at the synchronization requirement time point. The monitored network element obtains a current time point (which may be referred to as a first moment), adds the first moment to the first message, and includes a start identifier in the first message. Then, the monitored network element sends the first message to the monitoring network element. The start identifier may be represented by a value 1.

It should be noted that the first message may also be referred to as a BMP route update message, and is a message of a BMP packet type newly added to the BMP.

After step 502, the monitored network element does not send a route monitoring message to the monitoring network element within first preset duration after the monitored network element sends the first message to the monitoring network element. In this way, the monitoring network element may determine that the update set is empty.

Figure 5:
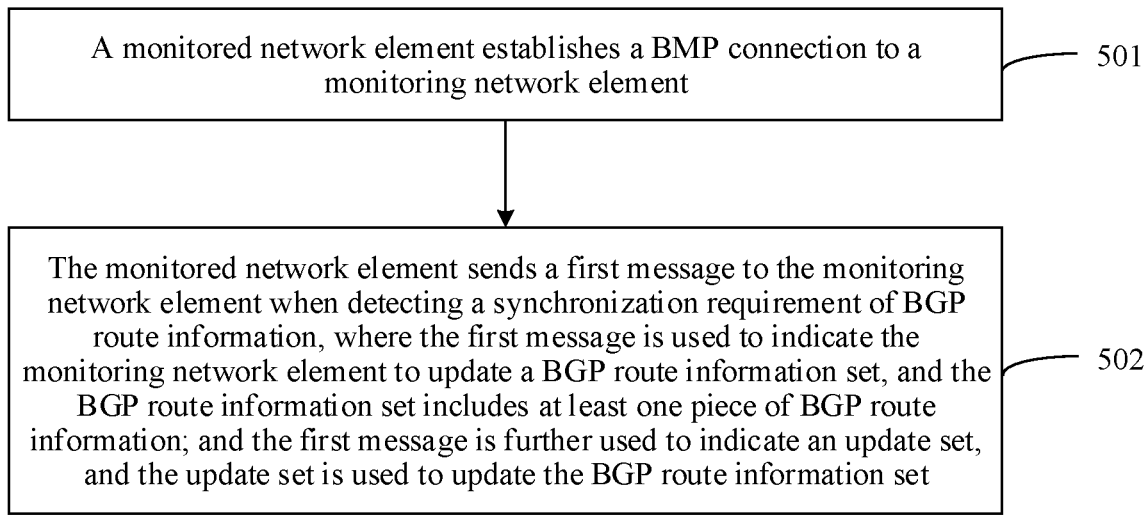
FIG. 5 is a schematic flowchart of a method for updating route information according to an example embodiment of this application.
Figure 6:
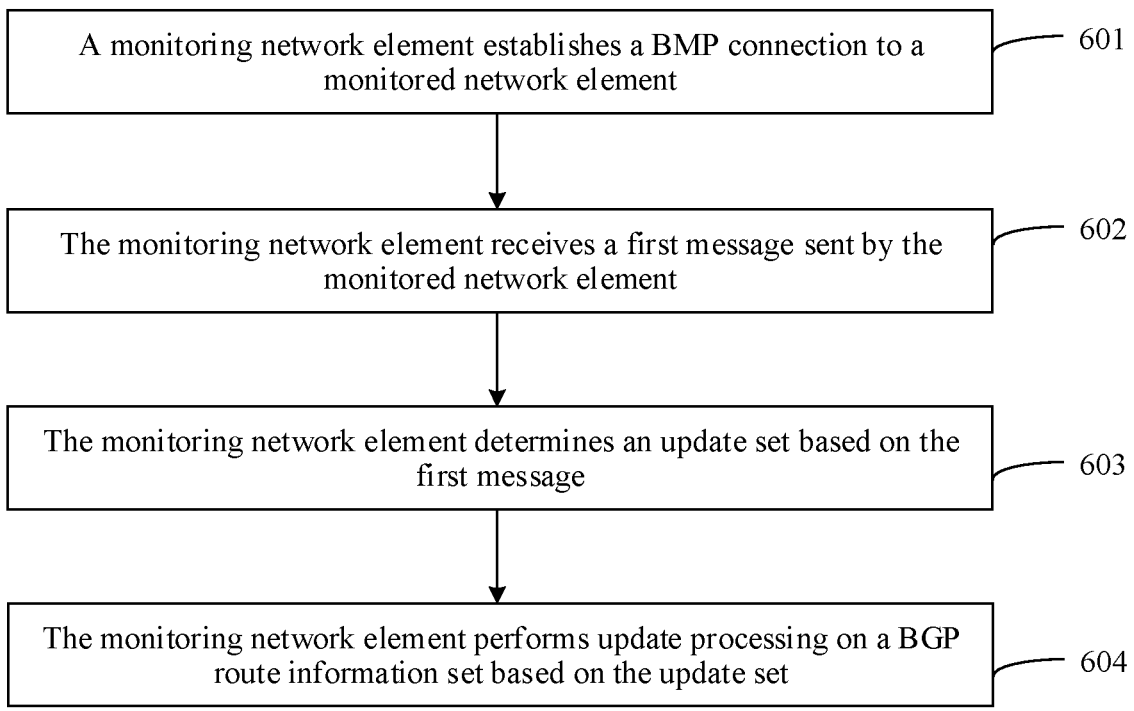
FIG. 6 is a schematic flowchart of a method for updating route information according to an example embodiment of this application.

Corresponding to the procedure in FIG. 5, processing on the monitoring network element is shown in FIG. 6.

Step 601: The monitoring network element establishes the BMP connection to the monitored network element.

Processing in step 601 is the same as that in step 501, and details are not described herein again.

Step 602: The monitoring network element receives the first message sent by the monitored network element.

The first message is used to indicate the monitoring network element to update a BGP route information set, and the BGP route information set includes at least one piece of BGP route information.

In this embodiment, the monitoring network element may parse a timestamp (namely, a first moment) and a start identifier from the first message, and then determine BGP route information that is stored by the monitoring network element and that is before the first moment. The monitoring network element uses BGP route information that is in the foregoing BGP route information and that is uploaded by the monitored network element to form the BGP route information set.

Alternatively, each BGP route message on the monitoring network element has an identifier. After receiving the first message, the monitoring network element parses a start identifier from the first message, and may determine a BGP route message that has an identifier and that is stored by the monitoring network element. The monitoring network element uses BGP route information that is in the BGP route information that has the identifier and that is uploaded by the monitored network element to form the BGP route information set. For example, in the BGP route information uploaded by the monitored network element in the monitoring network element, an identifier of each piece of BGP route information is 4, and the monitoring network element uses the BGP route information whose identifier is 4 in the BGP route information uploaded by the monitored network element to form the BGP route information set.

Optionally, the identifier may be a version set by the monitoring network element for the BGP route information, or may be an identifier used to mark the BGP route information as currently available route information, or the like.

Certainly, in step 602, the BGP route information set may be determined in another manner. This is not limited in this embodiment of this application.

Step 603: The monitoring network element determines an update set based on the first message.

In this embodiment, the monitoring network element may determine the timestamp in the first message, determine whether a timestamp of a received route monitoring message falls within first preset duration after the timestamp, and if the timestamp does not fall within the first preset duration, determine that the update set is empty.

Step 604: The monitoring network element performs update processing on the BGP route information set based on the update set.

In this embodiment, the monitoring network element may perform, by using the update set, update processing on the BGP route information set indicated by the first message, and the specific processing is marking BGP route information in the BGP route information set indicated by the first message as unavailable route information (for example, an identifier is added to indicate that the BGP route information is unavailable), or delete the BGP route information in the BGP route information set.

In a possible implementation, in the procedures in FIG. 5 and FIG. 6, the first message is further used to indicate a start point of the update set, and after the monitored network element sends the first message to the monitoring network element, the monitored network element may further send a second message to the monitoring network element. The second message is used to indicate an end point of the update set. Specific processing is as follows. The monitoring network element may determine a timestamp in the first message as the start point of the update set, and determine a timestamp in the second message as the end point of the update set. In the route monitoring messages (where the route monitoring message may be the RM message mentioned above) that are received by the monitoring network element and sent by the monitored network element, if there is no route monitoring message whose timestamp is between the start point and end point of the update set, it is determined that the update set is empty.

In this way, through the foregoing procedure, the monitored network element can indicate the monitoring network element to delete BGP route information in batches, thereby saving transmission resources.

Scenario 1 is used as an example. The monitored network element sends the first message to the monitoring network element, where the update set includes at least one piece of BGP route information. The following describes a procedure of the method for updating route information with reference to FIG. 7.

Step 701: A monitored network element establishes a BMP connection to a monitoring network element.

Step 702: When detecting the synchronization requirement of the BGP route information, the monitored network element sends a first message to the monitoring network element.

Processing in step 701 is the same as that in step 501, and details are not described herein again. Processing in step 702 is the same as that in step 502.

Step 703: The monitored network element sends at least one route monitoring message to the monitoring network element, where BGP route information included in the at least one piece of route monitoring information is used to form an update set.

The route monitoring message may be the RM message mentioned above.

In this embodiment, the monitored network element may determine BGP route information updated this time, and include the updated BGP route information in the route monitoring message. Then, the monitored network element sends the route monitoring message to the monitoring network element. The specific processing is as follows. A skilled person configures a preset quantity in the monitored network element, and after the monitored network element sends the first message to the monitoring network element, the monitored network element sends the route monitoring message to the monitoring network element, but the sent route monitoring message includes only a preset quantity of pieces of BGP route information. The preset quantity of pieces of BGP route information are used to update a BGP route information set. Alternatively, a skilled person configures second preset duration on the monitored network element, and the second preset duration may be equal to the foregoing first preset duration, or may not be equal to the foregoing first preset duration. After sending the first message to the monitoring network element, the monitored network element sends the route monitoring message to the monitoring network element, but the route monitoring message is sent only within the second preset duration after a timestamp in the first message. BGP route information in the route monitoring message sent within the second preset duration is used to update the BGP route information set.

In a possible implementation, the monitored network element may determine BGP route information with a same BGP route attribute but different route prefixes as BGP route information carried in one route monitoring message. Alternatively, the BGP route information updated this time may be equally divided into a plurality of pieces, and each route monitoring message carries one piece of BGP route information. Certainly, another manner may also be used. This is not limited in this embodiment of this application.

It should be noted that, the BGP route attribute may include an autonomous system path (AS_PATH) attribute, a route next-hop attribute, and a multi-exit discriminator (MED) attribute, a local-preference attribute, and the like. The autonomous system path indicates an autonomous system through which a route passes, the MED indicates how a data packet enters another autonomous system, and the local-preference indicates how a data packet leaves the autonomous system.

Figure 7:
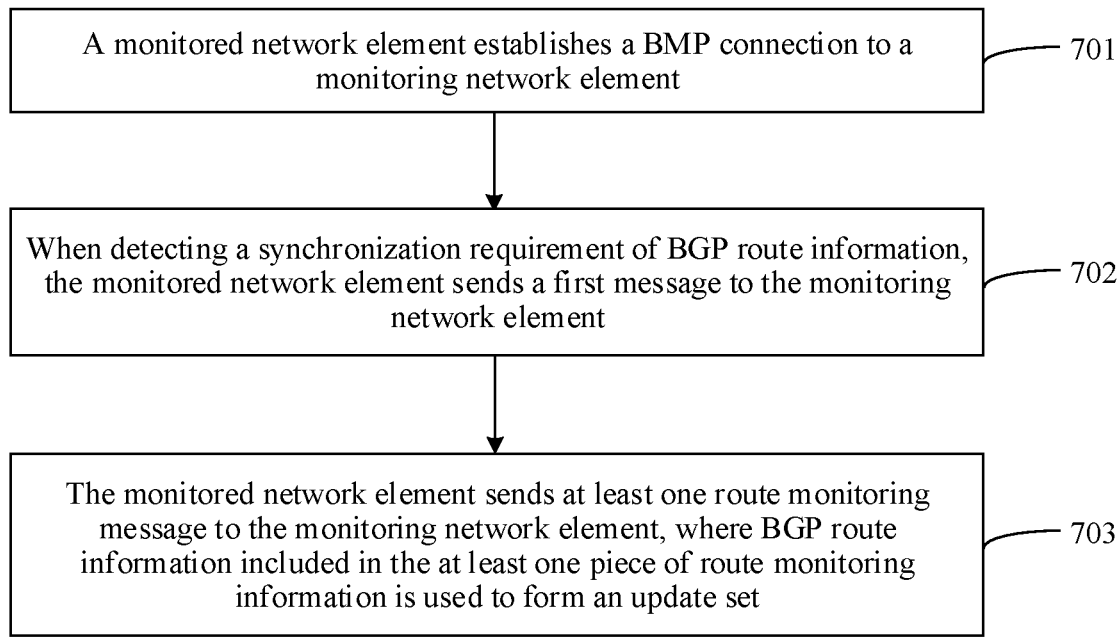
FIG. 7 is a schematic flowchart of a method for updating route information according to an example embodiment of this application.
Figure 8:
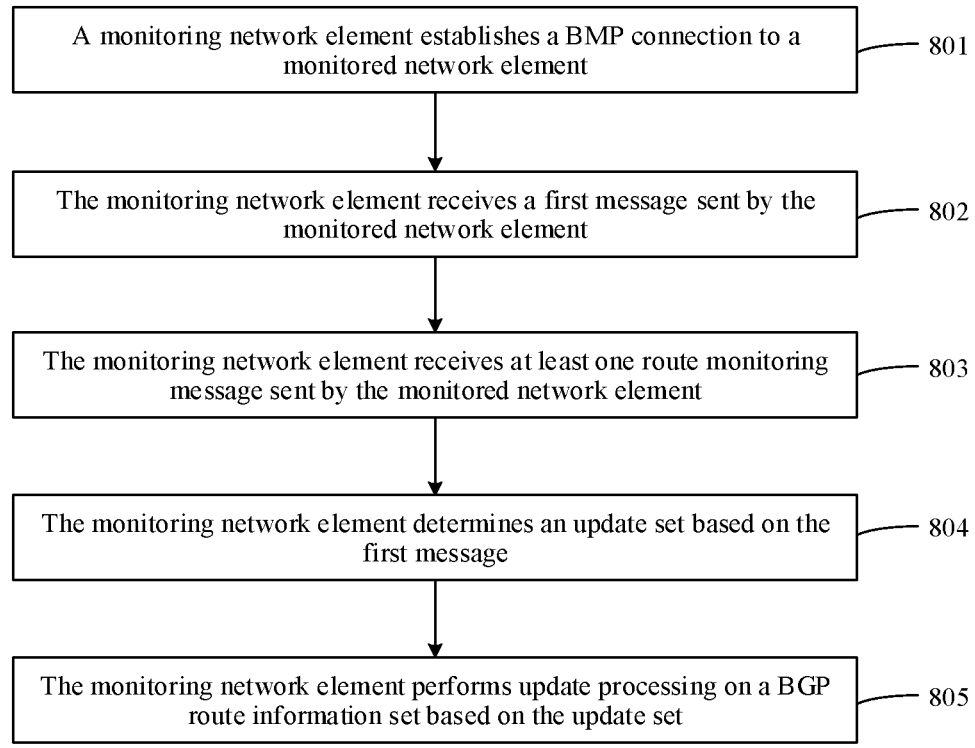
FIG. 8 is a schematic flowchart of a method for updating route information according to an example embodiment of this application.

Corresponding to the procedure in FIG. 7, processing on the monitoring network element is shown in FIG. 8.

Step 801: The monitoring network element establishes the BMP connection to the monitored network element.

Processing in step 801 is the same as that in step 501, and details are not described herein again.

Step 802: The monitoring network element receives the first message sent by the monitored network element.

The first message is used to indicate the monitoring network element to update a BGP route information set.

Processing in step 802 is the same as that in step 602, and details are not described herein again.

Certainly, in step 802, the BGP route information set may be determined in another manner. This is not limited in this embodiment of this application.

Step 803: The monitoring network element receives the at least one route monitoring message sent by the monitored network element.

The BGP route information included in the at least one piece of route monitoring information is used to form the update set.

Step 804: The monitoring network element determines the update set based on the first message.

In this embodiment, in the route monitoring message sent by the monitored network element, the monitoring network element determines a route monitoring message whose timestamp is closest to a timestamp of the first message, and determines a preset quantity of BGP route messages in the route monitoring messages. The monitoring network element uses the preset quantity of BGP route messages to form the update set.

Alternatively, in the route monitoring message sent by the monitored network element, the monitoring network element parses each route monitoring message to obtain a timestamp of each route monitoring message, and determines a route monitoring message whose timestamp is within closest second preset duration after a timestamp of the first message. The monitoring network element uses the BGP route messages included in the route monitoring message to form the update set.

Step 805: The monitoring network element performs update processing on the BGP route information set based on the update set.

In this embodiment, after the monitoring network element determines the update set, the monitoring network element may store the BGP route information in the update set, and delete the BGP route information set.

Alternatively, after the monitoring network element determines the update set, the monitoring network element may store the BGP route information in the update set, and mark BGP route information included in the BGP route information set as unavailable.

Alternatively, after the monitoring network element determines the update set, the monitoring network element may store BGP route information that is in the update set and that does not belong to the BGP route information set, and mark BGP route information that is in the BGP route information set and that does not belong to the update set as unavailable route information or delete the BGP route information. The monitoring network element does not process same BGP route information in the update set and the BGP route information set.

In this way, BGP route information on the monitoring network element can be updated in batches by using the procedures in FIG. 7 and FIG. 8.

Scenario 1 is used as an example. The monitored network element sends the first message to the monitoring network element, where the update set includes at least one piece of BGP route information. The monitored network element further sends the second message to the monitoring network element. The following describes a procedure of the method for updating route information with reference to FIG. 9.

Step 901: A monitored network element establishes a BMP connection to a monitoring network element.

Processing in step 901 is the same as that in step 501, and details are not described herein again.

Step 902: When detecting the synchronization requirement of the BGP route information, the monitored network element sends a first message to the monitoring network element.

Processing in step 902 is basically the same as that in step 502, except that in step 902, the first message is further used to indicate a start point of an update set. For example, a timestamp in the first message is the start point of the update set.

Step 903: The monitored network element sends at least one route monitoring message to the monitoring network element, where BGP route information included in the at least one piece of route monitoring information is used to form the update set.

Processing in step 903 is the same as that in step 703, and details are not described herein again.

Step 904: The monitored network element sends a second message to the monitoring network element.

The second message is used to indicate an end point of the update set.

In this embodiment, after sending to-be-sent BGP route information to the monitoring network element, the monitored network element may send the second message to the monitoring network element, so as to notify the monitoring network element of the end point of the update set. For example, an end point of the update set is a timestamp of the second message.

Figure 9:
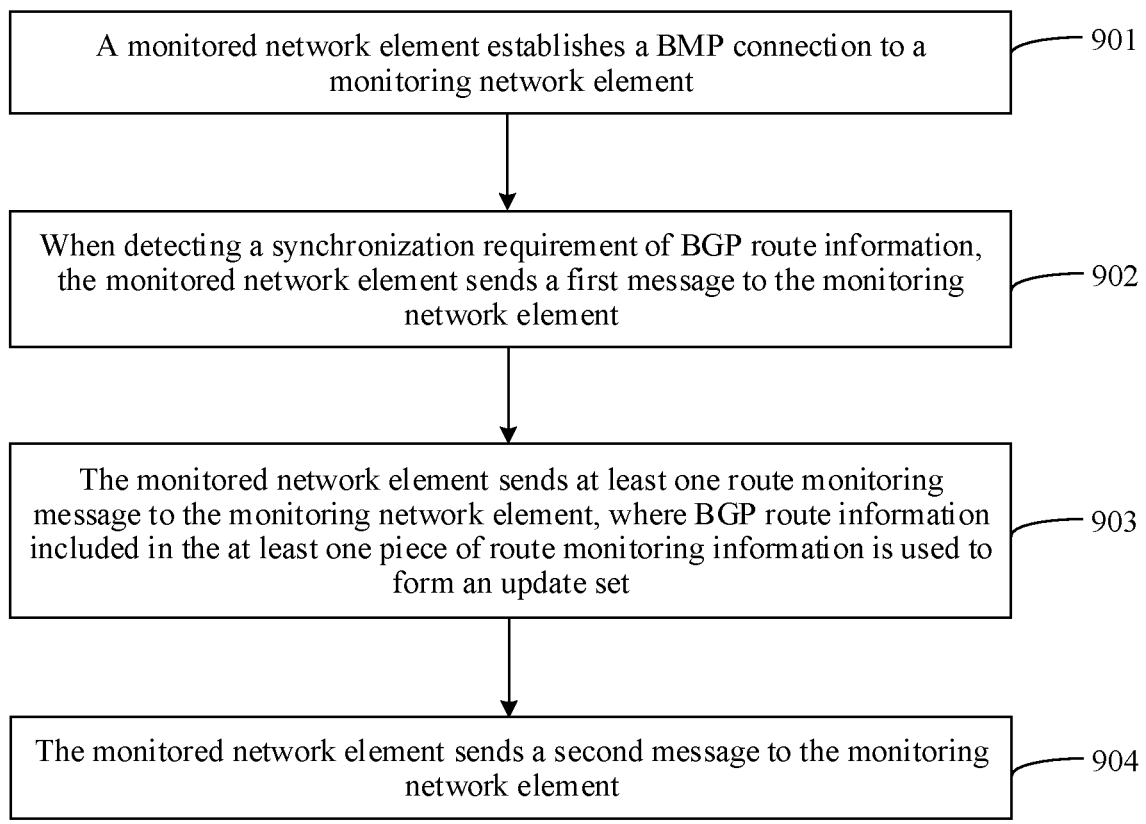
FIG. 9 is a schematic flowchart of a method for updating route information according to an example embodiment of this application.
Figure 10:
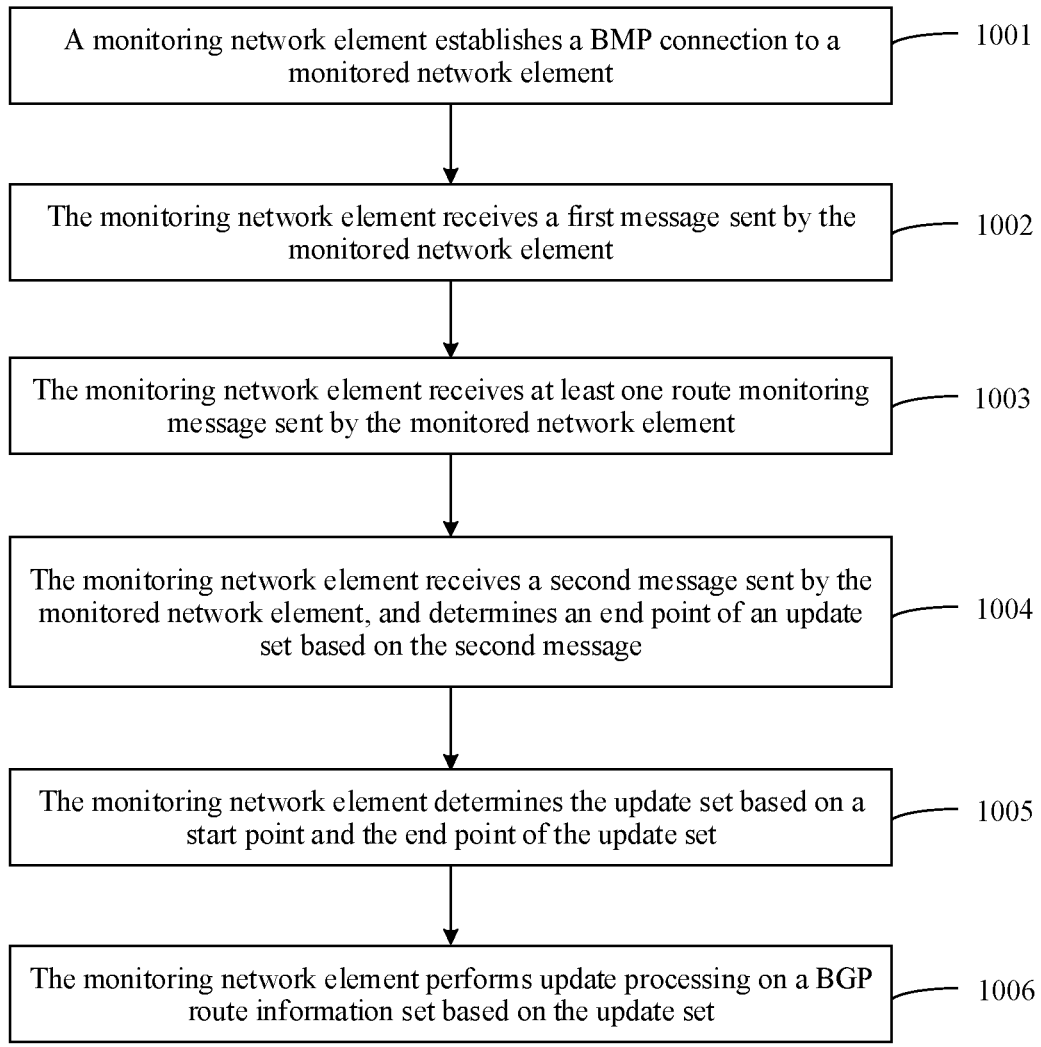
FIG. 10 is a schematic flowchart of a method for updating route information according to an example embodiment of this application.

Corresponding to the procedure in FIG. 9, processing on the monitoring network element is shown in FIG. 10.

Step 1001: The monitoring network element establishes the BMP connection to the monitored network element.

Processing in step 1001 is the same as that in step 501, and details are not described herein again.

Step 1002: The monitoring network element receives the first message sent by the monitored network element.

The first message is used to indicate the monitoring network element to update a BGP route information set, and the BGP route information set includes at least one piece of BGP route information. The first message is further used to indicate a start point of the update set.

Processing in step 1002 is the same as that in step 802, and details are not described herein again.

Certainly, in step 1002, the BGP route information set may be determined in another manner. This is not limited in this embodiment of this application.

Step 1003: The monitoring network element receives the at least one route monitoring message sent by the monitored network element.

The BGP route information included in the at least one piece of route monitoring information is used to form the update set. Processing in step 1003 is the same as that in step 803.

Step 1004: The monitoring network element receives the second message sent by the monitored network element, and determines an end point of the update set based on the second message.

In this embodiment, after receiving the second message sent by the monitored network element, the monitoring network element may parse a timestamp of the second message from the second message, and determine the timestamp as the end point of the update set.

Step 1005: The monitoring network element determines the update set based on the start point and the end point of the update set.

In this embodiment, in the route monitoring message sent by the monitored network element, the monitoring network element determines route monitoring messages whose timestamps are between a timestamp of the first message and the timestamp of the second message, and then the monitoring network element uses BGP route information in the route monitoring messages to form the update set.

Step 1006: The monitoring network element performs update processing on the BGP route information set based on the update set.

A processing process of step 1006 is the same as a processing process of step 805, and details are not described herein again.

In this way, BGP route information stored by the monitoring network element can be updated in batches by using the procedures in FIG. 9 and FIG. 10.

It should be noted that the second message may be a BMP message newly added in this application, or may be the End-of-RIB message mentioned above.

In addition, if the BGP route information stored by the monitoring network element has an identifier, the identifier is updated each time the BGP route information is updated, so that the BGP route information in the BGP route information set can be updated.

In addition, in the procedures shown in FIG. 5 to FIG. 10, when detecting the synchronization requirement, the monitored network element may send an update request to a to-be-updated BGP peer, to indicate the BGP peer to send the latest BGP route information to the monitored network element. Subsequently, the latest BGP route information may be reported to the monitoring network element.

In a possible implementation, in the procedures in FIG. 5 to FIG. 10, a skilled person may configure, in the monitored network element, a BGP peer address, an address family identifier, and a subsequent address family identifier that are of the BGP route information that needs to be updated. The BGP peer address is used to indicate a BGP peer whose BGP route information is to be updated in batches. The address family identifier and the subsequent address family identifier are an address family identifier and a subsequent address family identifier for updating BGP route information on the BGP peer.

The monitored network element may add the BGP peer address, the address family identifier, and the subsequent address family identifier to the first message. In this way, the first message includes the BGP peer address, the address family identifier, and the subsequent address family identifier. In this way, the monitoring network element may update BGP route information indicated by the address family identifier and the subsequent address family identifier in all BGP route information of the BGP peer to which the BGP peer address belongs. That is, the monitoring network element may determine the BGP route information set based on the BGP peer address, the address family identifier, and the subsequent address family identifier that are included in the first message. For example, the timestamp of the first message is the first moment, and the monitoring network element determines BGP route information whose timestamp is before the first moment in all BGP route information of the BGP peer to which the BGP peer address belongs. The BGP route information indicated by the address family identifier and the subsequent address family identifier is selected from the BGP route information, and the indicated BGP route information forms the BGP route information set. In this way, only a part of BGP route information may be updated.

Correspondingly, in the procedures shown in FIG. 7 to FIG. 10, the monitored network element may also find all the BGP route information of the BGP peer based on the BGP peer address configured by the skilled person, and then use the address family identifier and the subsequent address family identifier to select BGP route information from all the BGP route information of the BGP peer. The monitored network element sends the selected BGP route information by using the at least one route monitoring message.

In a possible implementation, in the procedures in FIG. 5 to FIG. 10, a skilled person may further configure a target route information type in the monitored network element. The target route information type is used to indicate one or more route information types in one or more route information types indicated by the address family identifier and the subsequent address family identifier.

The monitored network element may add the BGP peer address, the address family identifier, the subsequent address family identifier, and the target route information type to the first message. In this way, the first message includes the BGP peer address, the address family identifier, the subsequent address family identifier, and the target route information type. In this way, the monitoring network element may update BGP route information of the target route information type in all BGP route information of BGP route information indicated by the BGP peer, the address family identifier, and the subsequent address family identifier. That is, in all the BGP route information of the BGP route information indicated by the BGP peer, the address family identifier, and the subsequent address family identifier, the BGP route information of the target route information type forms the BGP route information set.

For example, for a BGP peer, if an address family identifier is 1 and a subsequent address family identifier is 1, it indicates IPv4 unicast. It indicates that only IPv4 unicast BGP route information of the BGP peer is updated. For another example, for an Ethernet virtual private network (VPN) (EVPN) address family, existing route information types are type 1 to type 11, and there are 11 route information types in total. If the target route information type is type 2 and type 5, the route monitoring message sent by the monitored network element to the monitoring network element includes only BGP route information of type 2 and type 5. In this way, the monitored network element can synchronize only a part of specified BGP route information of the BGP peer.

It should be noted herein that, assuming that the address family identifier and the subsequent address family identifier indicate only one route information type, a value of the target route information type may be 0. It is assumed that the address family identifier and the subsequent address family identifier indicate a plurality of route information types. If a value of the target route information type is 0, it indicates that BGP route information of all the route information types indicated by the address family identifier and the subsequent address family identifier is updated.

Correspondingly, in the procedures shown in FIG. 7 to FIG. 10, the monitored network element may find all the BGP route information of the BGP peer based on the BGP peer address, and then use the address family identifier, the subsequent address family identifier, and the target route information type to select BGP route information from all the BGP route information of the BGP peer. The monitored network element sends the selected BGP route information by using the at least one route monitoring message.

In a possible implementation, in the procedures in FIG. 5 to FIG. 10, a priority of each route information type under the target route information type may be preconfigured in the monitored network element by a skilled person. A route policy of each route information type may be preconfigured in the monitored network element by a skilled person, and correspondingly each routing policy is indicated by a unique identifier. The monitored network element may add the priority of each route information type to the first message.

Similarly, the monitored network element may also add a route policy identifier of each route information type to the first message.

The priority is used to indicate BGP route information of a route information type that is to be preferentially reported. After sending the first message to the monitoring network element, the monitored network element may sequentially send the route monitoring message to the monitoring network element in descending order of priorities based on the priorities of the route information types. For example, the priorities may be identified by values 1, 2, 3 (for example, if the value is 1, 2, or 3, corresponding priorities are in descending order or ascending order). Sending time of BGP route information of a high-priority route information type is earlier than sending time of BGP route information of a low-priority route information type. For example, for an EVPN address family, existing route information types are defined as type 1 to type 11. There are 11 route information types in total, and the monitored network element specifies that BGP route information of type 4 is preferentially reported. A priority corresponding to type 4 is level 1, indicating the highest priority. The monitored network element may determine, based on the priority in the first message, BGP route information of which route information type is to be preferentially uploaded. In this way, the monitored network element may upload high-priority BGP route information based on the priority.

For each route information type in the target route information type, the monitoring network element may select, based on the route policy identifier of the route information type, BGP route information from BGP route information indicated by the BGP peer address, the address family identifier, the subsequent address family identifier, and the route information type that are included in the first message, to form the BGP route information set.

After the monitored network element sends the first message to the monitoring network element, for the route policy identifier of each route information type, the monitored network element may select, based on the route policy identifier of the route information type, BGP route information to be synchronized to the monitoring network element from the BGP route information indicated by the BGP peer address, the address family identifier, the subsequent address family identifier, and the route information type. In this way, each route information type is selected in this manner, and updated BGP route information of each route information type may be selected.

Optionally, the route policy identifier is used to indicate a manner of selecting BGP route information in the route monitoring message. There is a plurality of types of route policies indicated by the route policy identifier, such as an address prefix list and an autonomous system (AS) path filter. For example, a route policy indicated by the route policy identifier is an address prefix list. The address prefix list is a filter that includes a group of route information filtering rules. A skilled person may define a prefix in the filtering rule. In this way, when selecting the BGP route information in the route monitoring message, the monitored network element selects, from the BGP route information by using the route policy indicated by the route policy identifier, BGP route information that meets the route policy, and determines the BGP route information as the BGP route information in the route monitoring message. In this way, the monitored network element may use the route policy to select a part of BGP route information for synchronization.

It should be noted herein that both the route policy identifier and the priority may be added to the first message, or only any one of the route policy identifier and the priority may be added to the first message. This is not limited in this embodiment of this application.

In a possible implementation, in the procedures in FIG. 5 to FIG. 10, when the first message includes the BGP peer address, the address family identifier, and the subsequent address family identifier, processing in which the monitoring network element determines the BGP route information set includes the following.

The monitoring network element determines the BGP route information set based on the BGP peer address, the address family identifier, and the subsequent address family identifier that are included in the first message.

In this embodiment, the monitoring network element may determine, based on the BGP peer address included in the first message, a BGP peer to which to-be-updated BGP route information belongs. Then, the monitoring network element determines, by using the timestamp of the first message (namely, the first moment), BGP route information of the BGP peer before the first moment. The monitoring network element determines, by using the address family identifier and the subsequent address family identifier, BGP route information indicated by the address family identifier and the subsequent address family identifier in the BGP route information of the BGP peer before the first moment. The monitoring network element determines the indicated BGP route information as the BGP route information set indicated by the first message.

Alternatively, the monitoring network element may determine, based on the BGP peer address, the address family identifier, and the subsequent address family identifier that are included in the first message, BGP route information whose version is the latest version and that is indicated by the BGP peer address, the address family identifier, and the subsequent address family identifier that are included in the first message, to form the BGP route information set.

In this way, BGP route information indicated by some address family identifiers and subsequent address family identifiers of the BGP peer may be updated.

In a possible implementation, when the first message includes the BGP peer address, the address family identifier, the subsequent address family identifier, and the target route information type, processing performed by the monitoring network element includes the following.

The monitoring network element determines the BGP route information set based on the BGP peer address, the address family identifier, the subsequent address family identifier, and the target route information type that are included in the first message.

In this embodiment, the monitoring network element may determine, based on the BGP peer address included in the first message, a BGP peer to which to-be-updated BGP route information belongs. Then, the monitoring network element determines, by using the timestamp of the first message (namely, the first moment), BGP route information of the BGP peer before the first moment. The monitoring network element determines, by using the address family identifier, the subsequent address family identifier, and the target route information type, BGP route information indicated by the address family identifier, the subsequent address family identifier, and the target route information type in the BGP route information of the BGP peer before the first moment. The monitoring network element determines the indicated BGP route information as the BGP route information set indicated by the first message.

Certainly, when the target route information type is used, a version may also be used instead of the timestamp of the first message.

In this way, only BGP route information of some route information types in some address family identifiers and subsequent address family identifiers of the BGP peer may be updated.

In a possible implementation, when the first message further includes the route policy identifier of each route information type in the target route information type, processing performed by the monitoring network element includes the following.

The monitoring network element determines the BGP route information set based on the BGP peer address, the address family identifier, the subsequent address family identifier, the target route information type, and the route policy identifier of each route information type that are included in the first message.

In this embodiment, the monitoring network element stores the route policy corresponding to each route policy identifier, and after the monitoring network element selects the BGP route information that is indicated by the BGP peer address, the address family identifier, the subsequent address family identifier, and the target route information type and that is before the first moment, a route policy indicated by each route information type may be determined by using the route policy identifier of each route information type in the target route information type. Then, for each route information type, the monitoring network element may use a route policy of the route information type to select BGP route information from BGP route information corresponding to the route information type. The BGP route information selected according to the route policy of each route information type is the BGP route information set indicated by the first message.

Certainly, when the route policy identifier is used, a version may also be used instead of the timestamp of the first message.

In this way, only the BGP route information selected by using the route policy may be updated.

In a possible implementation, when the first message further includes the priority of each route information type in the target route information type, processing performed by the monitoring network element may be performing update processing on the BGP route information set based on the BGP route information included in the update set and the priority of each route information type.

In this embodiment, the monitoring network element may determine, from the BGP route information set based on the priority of each route information type in the first message, the BGP route information of a high-priority route information type. Then, by using the BGP route information in the at least one route monitoring message, the monitoring network element preferentially updates the BGP route information of the high-priority route information type, and then updates BGP route information of a low-priority route information type. That is, update time of BGP route information of a high-priority route information type is earlier than update time of BGP route information of a low-priority route information type. In this way, the high-priority BGP route information can be preferentially updated, so that the high-priority BGP route information can be used as soon as possible.

In a possible implementation, when the first message further includes the priority and the route policy identifier of each route information type in the target route information type, processing performed by the monitoring network element includes the following.

After selecting the BGP route information that are indicated by the BGP peer address, the address family identifier, the subsequent address family identifier, and the target route information type and that are before the first moment, the monitoring network element may parse the route policy identifier of each route information type from the first message. Then, the monitoring network element may determine, by using the route policy identifier of each route information type in the target route information type, a route policy indicated by each route information type. The monitoring network element may obtain the priority of each route information type from the first message. The monitoring network element sequentially uses route policies of each route information type in descending order of priorities, to select the BGP route information set from indicated BGP route information. The monitoring network element updates the selected BGP route information set in descending order of priorities.

Further, in the procedures in FIG. 7 to FIG. 10, there may be a plurality of manners of performing update processing on the BGP route information set indicated by the first message of the monitoring network element, and four feasible manners are provided below.

Manner 1: After receiving the second message sent by the monitored network element, the monitoring network element may perform deletion processing on the BGP route information set indicated by the first message, and store the BGP route information in the update set. In this way, only available BGP route information is stored. This can save storage space.

Manner 2: After receiving the second message sent by the monitored network element, the monitoring network element marks the BGP route information set indicated by the first message as an unavailable route, and stores the BGP route information in the update set. In this way, the BGP route information can be stored, and new BGP route information can be obtained.

Manner 3: After receiving the second message sent by the monitored network element, the monitoring network element determines BGP route information that is in the BGP route information set indicated by the first message and that is different from the update set, and determines the part of BGP route information as an unavailable route, or delete the part of BGP route information. The monitoring network element determines BGP route information that is in the update set and that is different from the BGP route information set indicated by the first message. The part of route information is BGP route information that is not synchronized in time, and the monitoring network element may store the part of BGP route information. BGP route information that is in the update set and that is the same as the BGP route information set is not processed. In this way, BGP route information stored by the monitoring network element is currently available BGP route information. For example, it is assumed that BGP route information in a route monitoring message whose timestamp is between the first moment and a second moment forms an update set A, and BGP route information indicated by the first message forms a BGP route information set B. BGP route information in the BGP route information set B that does not belong to the update set A (where the part of BGP route information is BGP route information that is not deleted or withdrawn in time) is deleted or labeled as unavailable route. BGP route information in the update set A that does not belong to the BGP route information set B (where the part of BGP route information is BGP route information that is not synchronized in time) is stored in the monitoring network element. BGP route information that is in the update set and that is the same as the BGP route information set is not processed. In this way, BGP route information of the monitored network element and the monitoring network element can be synchronized.

Manner 4: After receiving the first message sent by the monitored network element and before receiving the second message, the monitoring network element performs update processing on the BGP route information set by using the BGP route information in the route monitoring message as long as the monitoring network element receives the route monitoring message. In this way, the monitoring network element can obtain the latest BGP route information in time. After receiving the second message sent by the monitored network element, the monitoring network element may perform deletion processing on the route information that is in the BGP route information set and that does not belong to the update set, or mark the BGP route information as unavailable. In this way, the monitoring network element can clear unavailable BGP route information in time.

It should be noted that, in Manner 1 to Manner 3, the monitoring network element performs update processing on the BGP route information set in a unified manner, and in Manner 4, the monitoring network element performs update processing on the BGP route information set as long as the monitoring network element receives the route monitoring message.

In addition, if the BGP route information stored by the monitoring network element has a version, after updating the BGP route information in the BGP route information set, the monitoring network element updates the version of the BGP route information, so as to identify the latest BGP route information.

It should be further noted that, in this embodiment of this application, a BMP message is newly added to the six types of BMP messages, and is used to update BGP route information. In other words, the BMP message in this embodiment of this application includes seven types of messages, one type of message is newly added, and remaining messages are specified by the original BMP.

Figure 11:
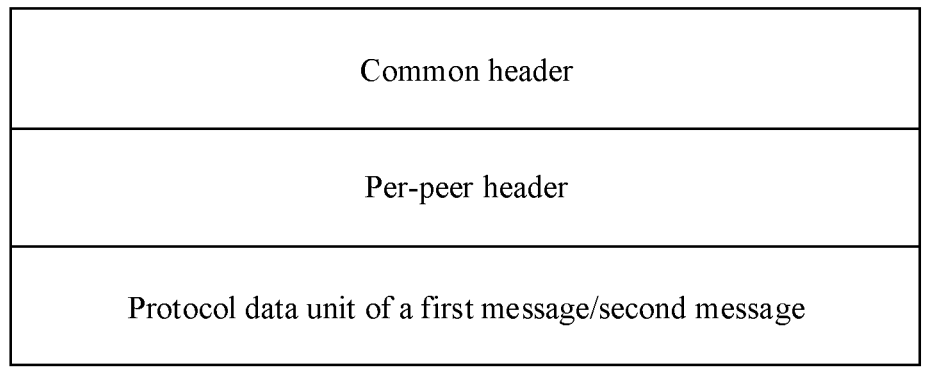
FIG. 11 is a schematic diagram of a first message or a second message according to an example embodiment of this application.
Figure 12:
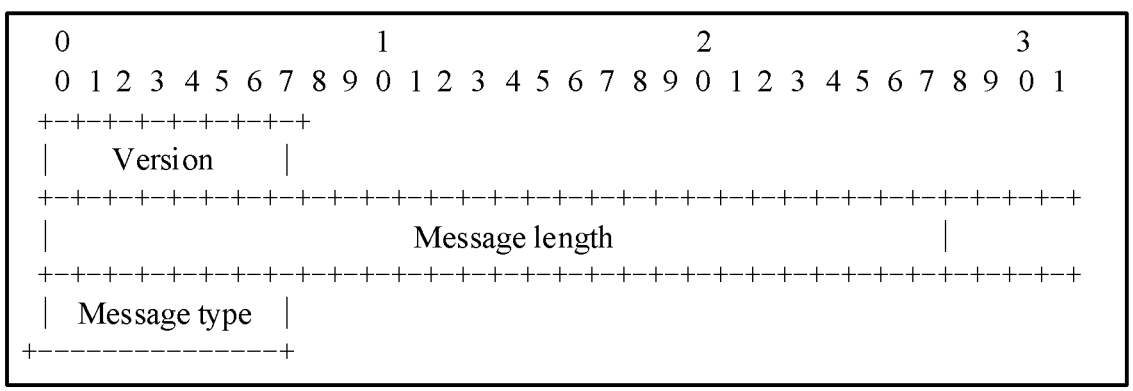
FIG. 12 is a schematic diagram of a common header according to an example embodiment of this application.
Figure 13:
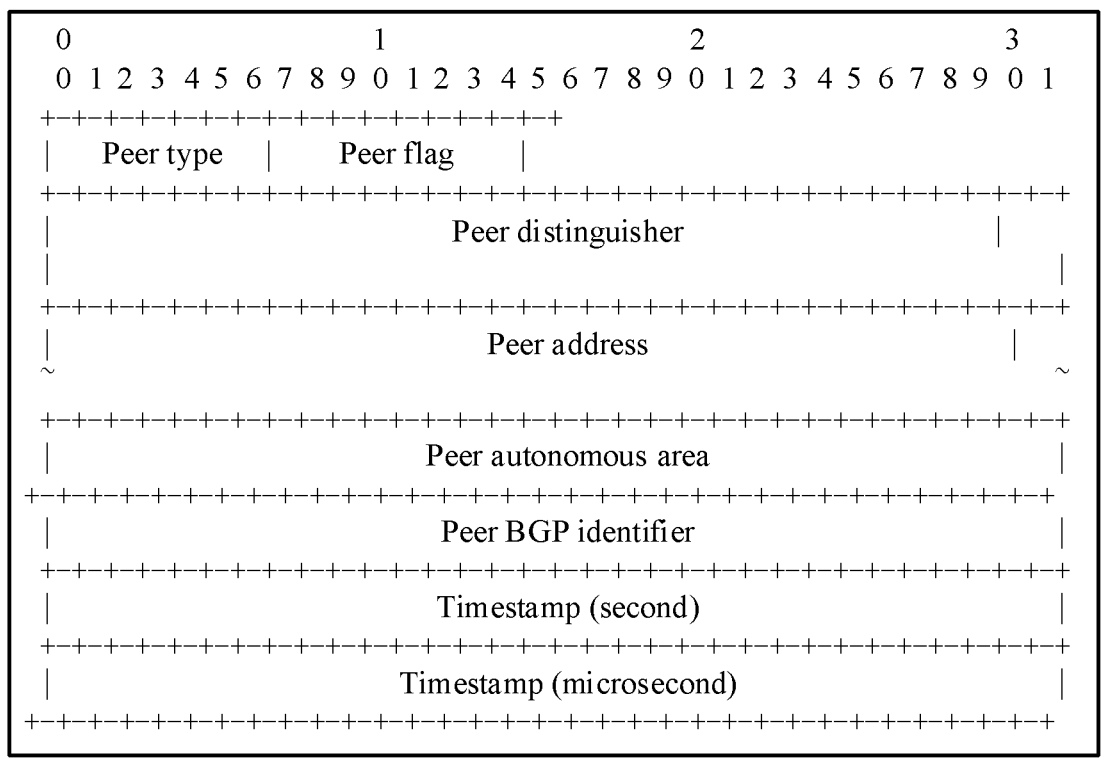
FIG. 13 is a schematic diagram of a per-peer header according to an example embodiment of this application.

Further, a format of the newly added BMP message is shown in FIG. 11, and includes a common header, a per-peer header, and a protocol data unit (PDU) of the newly added BMP message (first message/second message). As shown in FIG. 12, the common header includes a version, a message length, a message type, and the like. As shown in FIG. 13, the per-peer header includes a peer type, a peer flag, a peer distinguisher, a peer address, an autonomous system to which a peer belongs (peer AS), a BGP identifier (ID), and a timestamp of the peer (where the timestamp can be divided into two parts, in seconds and in microseconds).

Figure 14:
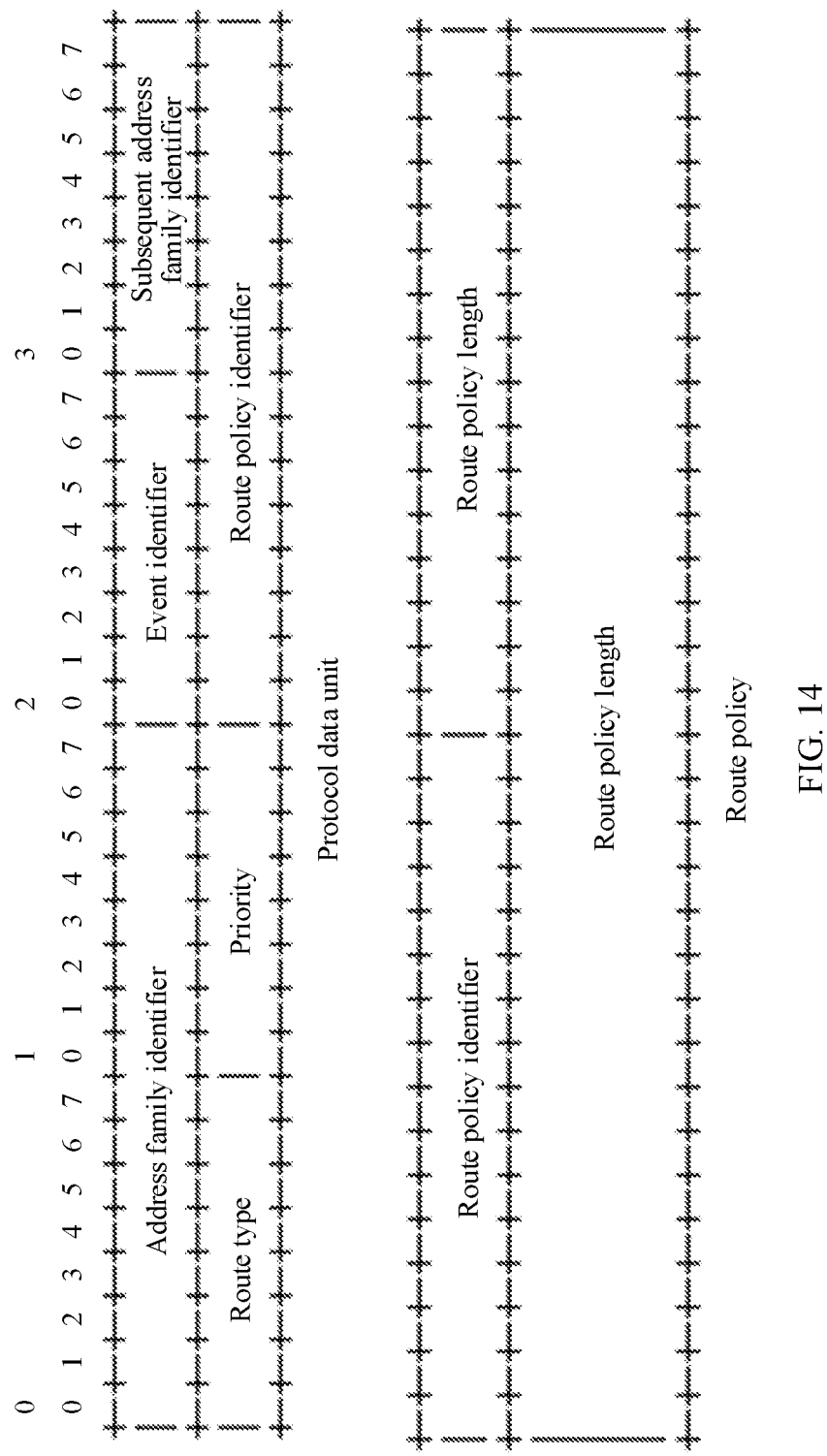
FIG. 14 is a schematic diagram of a protocol data unit and a route policy according to an example embodiment of this application.

As shown in FIG. 14, the protocol data unit of the newly added BMP message may include an address family identifier, an event identifier (a start identifier and an end identifier), a subsequent address family identifier, and a route-type. Optionally, the PDU of the newly added BMP message may further include a priority. Optionally, the protocol data unit of the newly added BMP message may further include a route policy ID. Optionally, a format of a route policy is defined as a route policy identifier, a length of the route policy, and the route policy itself.

It should be noted herein that, when no route policy is used, the route policy identifier in the protocol data unit of the newly added BMP message may be set to 0.

It should be further noted herein that, in FIG. 14, if the event identifier is the start identifier, the newly added BMP message is the first message, or if the event identifier is the end identifier, the newly added BMP message is the second message.

Figure 15:
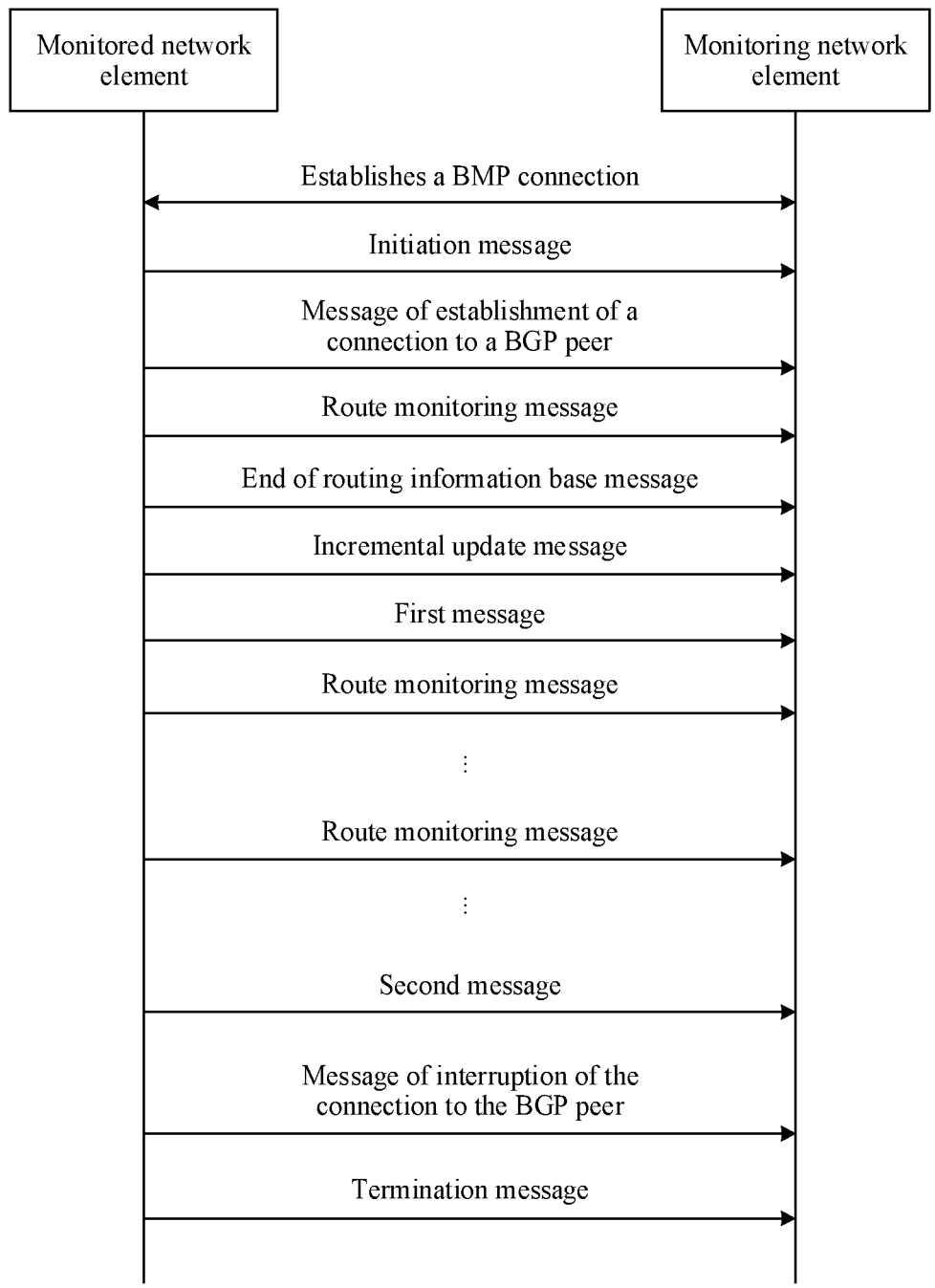
FIG. 15 is a schematic diagram of interaction between a monitoring network element and a monitored network element according to an example embodiment of this application.

In addition, in this embodiment of this application, corresponding to the procedures in FIG. 9 and FIG. 10, a schematic diagram of sending all BMP messages between the monitored network element and the monitoring network element is further provided, as shown in FIG. 15.

In this embodiment of this application, when detecting a synchronization update requirement, the monitored network element may send the first message to the monitoring network element, and then send BGP route information in batches, to indicate the monitoring network element to update the BGP route information in batches. Therefore, BGP route information of the monitoring network element and the monitored network element can be synchronized.

Corresponding to the foregoing scenario 2, a procedure of updating BGP route information is described with reference to FIG. 16.

Step 1601: A monitoring network element sends a BMP monitoring instruction to a monitored network element.

The BMP monitoring instruction indicates the monitored network element to detect a synchronization requirement of BGP route information, and subsequently send a first message and the like to the monitored network element.

In this embodiment, when the monitoring network element detects that duration for establishing a BMP connection to the monitored network element reaches preset duration, the monitoring network element may generate the BMP monitoring instruction, and send the BMP monitoring instruction to the monitored network element.

Alternatively, the monitoring network element detects that a fault occurs on the monitored network element, and after the fault of the monitored network element is rectified (for example, after sending a PD message to the monitoring network element, the monitored network element establishes a connection to the monitoring network element, or duration after last time the monitored network element sends a message to the monitoring network element exceeds specific duration, where the specific duration is relatively long), the monitoring network element may send the BMP monitoring instruction to the monitored network element.

Alternatively, the monitoring network element detects that route flapping occurs on the monitored network element, and after the route flapping stops, the monitoring network element may send the BMP monitoring instruction to the monitored network element.

Alternatively, if the monitoring network element determines that a quantity of failures of packet forwarding based on some BGP route information reaches a specific value, the monitoring network element may generate the BMP monitoring instruction, and send the BMP monitoring instruction to a monitored network element that provides the BGP route information. In this case, the monitoring network element establishes communication connections to devices responsible for packet forwarding, and may obtain, from these devices, BGP route information of failed packet forwarding.

Alternatively, the monitoring network element establishes a communication connection to a packet traffic monitoring system, the packet traffic monitoring system finds that a packet traffic forwarding fault occurs on the monitored network element, and the monitoring system may send an instruction for obtaining BGP route information to the monitored network element. After receiving the instruction, the monitoring network element may send the BMP monitoring instruction to the monitored network element.

It should be noted that the foregoing manners are merely several possible manners. Certainly, other manners may also be used. This is not limited in this embodiment of this application.

Figure 17:
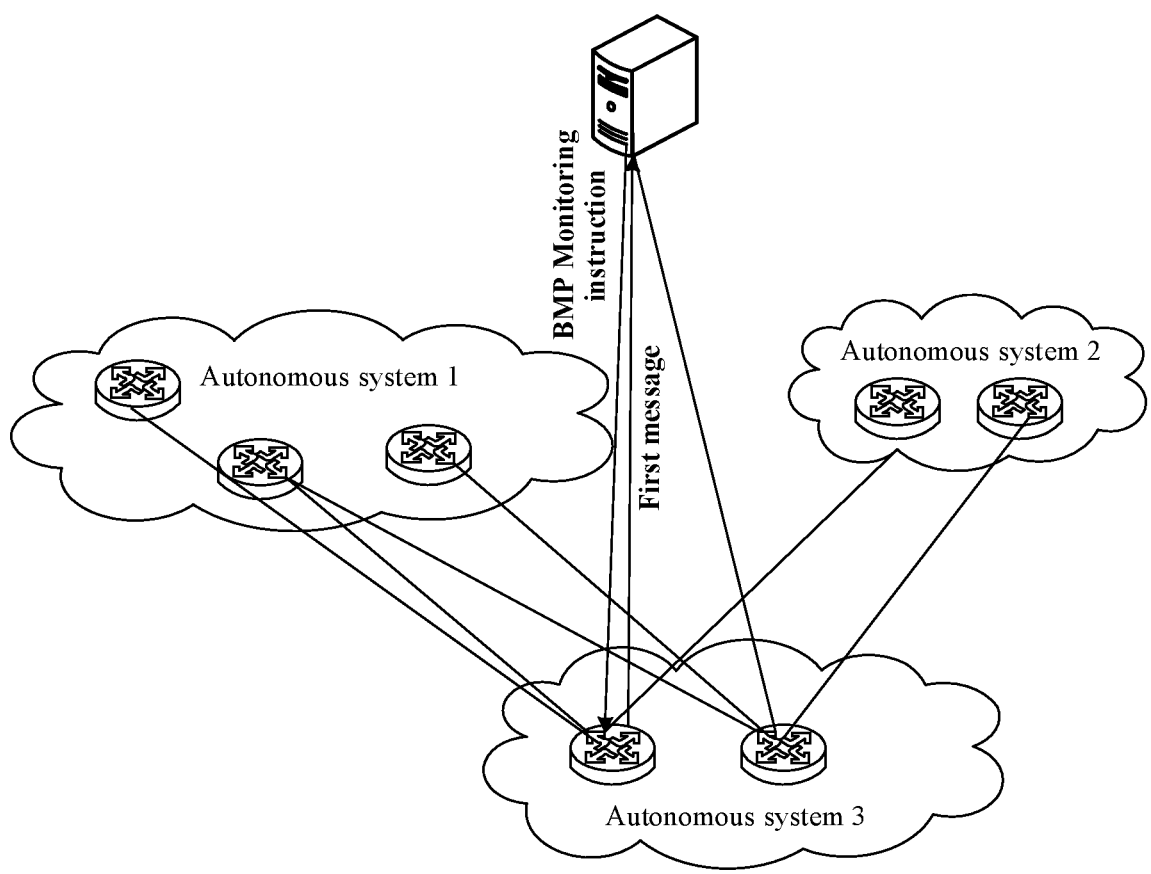
FIG. 17 is a schematic diagram of a scenario of updating route information according to an example embodiment of this application.

In a possible implementation, a control protocol session (for example, a route policy distribution (RPD) protocol session) is established between the monitoring network element and the monitored network element. The monitoring network element may send the BMP monitoring instruction through the control protocol session. For example, as shown in FIG. 17, the monitoring network element monitors monitored network elements of three autonomous systems (an autonomous system 1, an autonomous system 2, and an autonomous system 3). FIG. 17 shows a BMP monitoring instruction and a first message between the monitoring network element and monitored network elements in autonomous system 3.

In a possible implementation, the BMP monitoring instruction further includes a BGP peer address, an address family identifier, and a subsequent address family identifier. In the first three cases of step 1601, the monitoring network element may add the BGP peer address, the address family identifier, and the subsequent address family identifier that are configured by a skilled person to the BMP monitoring instruction. In this way, the monitoring network element may control which BGP route information is to be updated. Optionally, the BMP monitoring instruction further includes the target route information type, and the target route information type is one or more route information types indicated by the address family identifier and the subsequent address family identifier. The monitoring network element may further add the target route information type configured by a skilled person to the BMP monitoring instruction. In this way, the monitoring network element may control which BGP route information indicated by the address family identifier and the subsequent address family identifier is to be updated.

In the fourth case of step 1601, the monitoring network element may add, to the BMP monitoring instruction, a BGP peer address to which BGP route information of failed packet forwarding belongs, an address family identifier, and a subsequent address family identifier (where these concepts have been described above and are not be described herein again). In this way, the monitoring network element may control which BGP route information is to be updated. Optionally, the monitoring network element may add, to the BMP monitoring instruction, a target route information type to which the BGP route information of the failed packet forwarding belongs. In this way, the monitoring network element may control which BGP route information indicated by the address family identifier and the subsequent address family identifier is to be updated.

In the fifth case of step 1601, the packet traffic monitoring system may further provide BGP route information of a packet traffic forwarding fault for the monitoring network element. The monitoring network element may add, to the BMP monitoring instruction, a BGP peer address to which the BGP route information of the packet traffic forwarding fault belongs, an address family identifier, and a subsequent address family identifier (where these concepts have been described above and are not be described herein again). In this way, the monitoring network element may control which BGP route information is to be updated. Optionally, the monitoring network element may add, to the BMP monitoring instruction, a target route information type to which the BGP route information of the failed packet forwarding belongs. In this way, the monitoring network element may control which BGP route information indicated by the address family identifier and the subsequent address family identifier is to be updated.

In a possible implementation, for the five cases in step 1601, a skilled person further configures a priority corresponding to a route information type, and the monitoring network element may add a priority corresponding to each route information type in the target route information type to the BMP monitoring instruction. In this way, the monitoring network element may specify to update high-priority BGP route information first.

In a possible implementation, for the five cases in step 1601, a skilled person further configures a route policy identifier corresponding to a route information type, and the monitoring network element may add a route policy corresponding to each route information type in the target route information type to the BMP monitoring instruction. In this way, the monitoring network element can specify a route policy for updating only a part of BGP route information.

Step 1602: The monitored network element receives the BMP monitoring instruction sent by the monitoring network element, and determines that the synchronization requirement of the BGP route information is detected.

Step 1603: The monitored network element generates the first message based on the BGP peer address, the address family identifier, and the subsequent address family identifier that are included in the BMP monitoring instruction.

In this embodiment, the monitored network element may add the BGP peer address, the address family identifier, the subsequent address family identifier, and the target route information type that are included in the BMP monitoring instruction to the first message (where the first message is described above, and details are not described herein again).

In a possible implementation, the BMP monitoring instruction further includes a route policy corresponding to each route information type in the target route information type. The monitored network element adds the route policy corresponding to each route information type to the first message.

Step 1604: The monitored network element sends the first message to the monitoring network element, so that the monitoring network element updates a BGP route information set indicated by the first message.

In this embodiment, processing in step 1604 is the same as processing of the procedures shown in step 502 in FIG. 5 and step 602 to step 604 in FIG. 6. Alternatively, processing in step 1604 is completely the same as that in the procedure shown in step 702 to step 703 in FIG. 7 and step 802 to step 805 in FIG. 8. Alternatively, processing in step 1604 is completely the same as that in the procedures shown in step 902 to step 904 in FIG. 9 and step 1002 to step 1006 in FIG. 10. Details are not described herein again.

Optionally, in the procedures in FIG. 7 and FIG. 9, the monitored network element may determine, by using the BGP peer address, the address family identifier, and the subsequent address family identifier that are included in the BMP monitoring instruction, BGP route information included in at least one route monitoring message. Optionally, the monitored network element may alternatively determine, by using the BGP peer address, the address family identifier, the subsequent address family identifier, and the target route information type that are included in the BMP monitoring instruction, BGP route information included in at least one route monitoring message. Optionally, the monitored network element may alternatively determine BGP route information included in at least one route monitoring message by using the BGP peer address, the address family identifier, the subsequent address family identifier, the target route information type, and a priority and/or a route policy identifier corresponding to target route information that are included in the BMP monitoring instruction.

Figure 18:
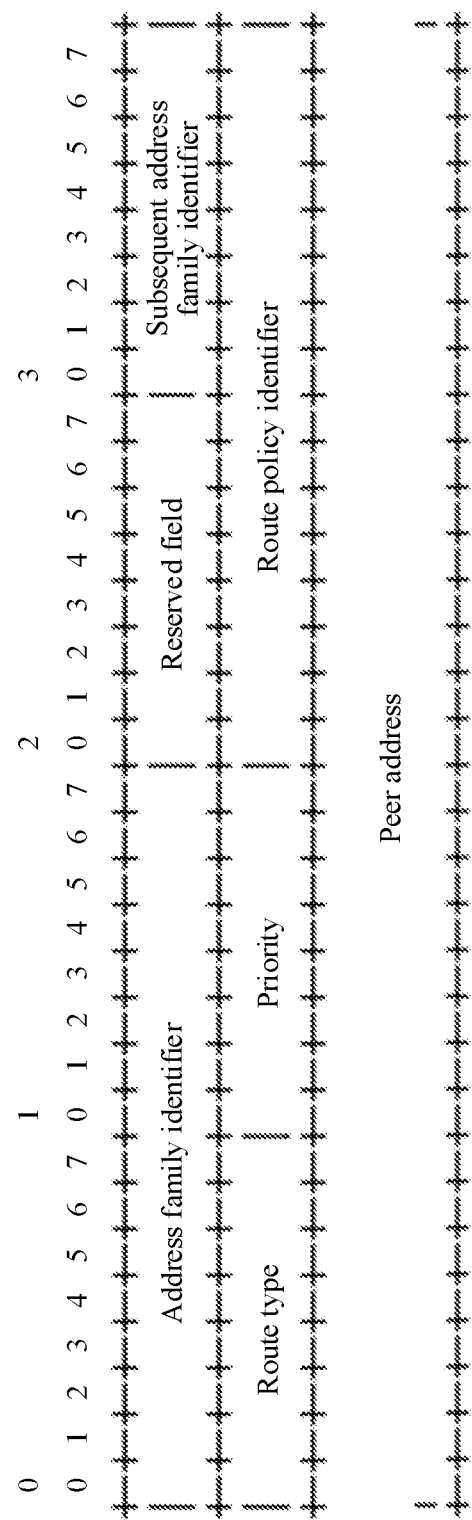
FIG. 18 is a schematic diagram of a BMP monitoring instruction according to an example embodiment of this application.

In addition, this embodiment of this application further provides a format of the BMP monitoring instruction. As shown in FIG. 18, the BMP monitoring instruction includes a BGP peer address, an address family identifier, a subsequent address family identifier, and a route information type. Optionally, the BMP monitoring instruction further includes a priority corresponding to a route information type and/or a route policy identifier corresponding to the route information type. Optionally, the BMP monitoring instruction further includes a reserved field.

Figure 16:
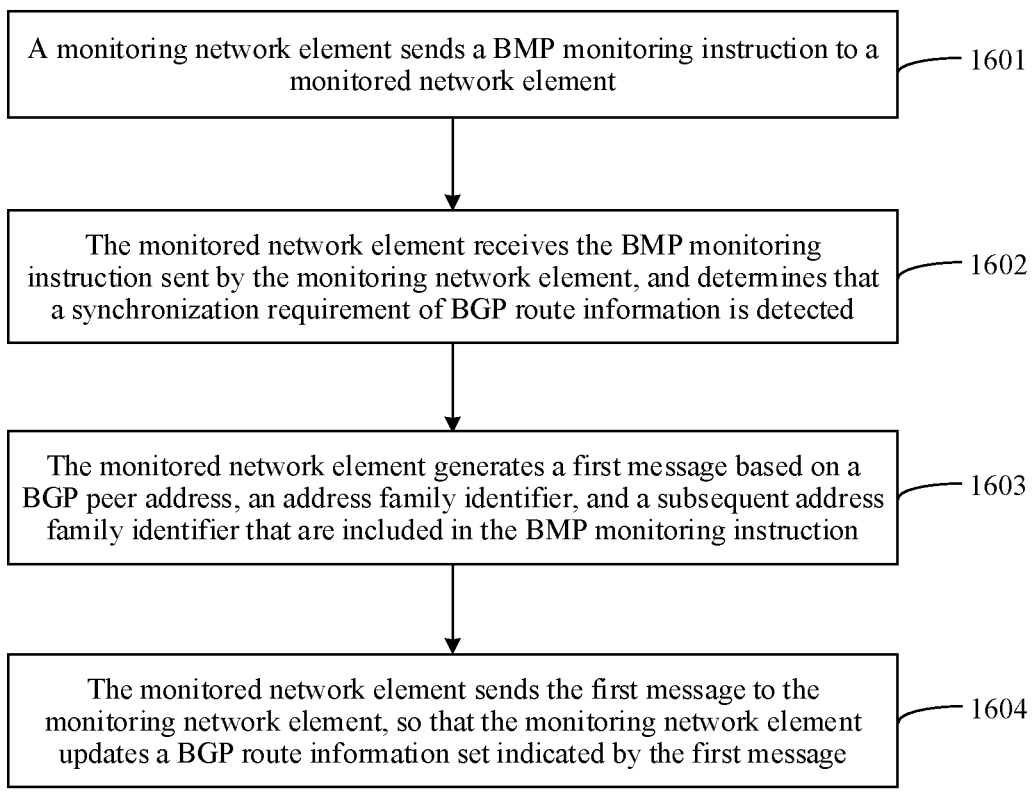
FIG. 16 is a schematic flowchart of a method for updating route information according to an example embodiment of this application.

In addition, in the procedure shown in FIG. 16, when detecting the synchronization requirement, the monitored network element may send an update request to a to-be-updated BGP peer, to indicate the BGP peer to send the latest BGP route information to the monitored network element. Subsequently, the latest BGP route information may be reported to the monitoring network element.

Figure 19:
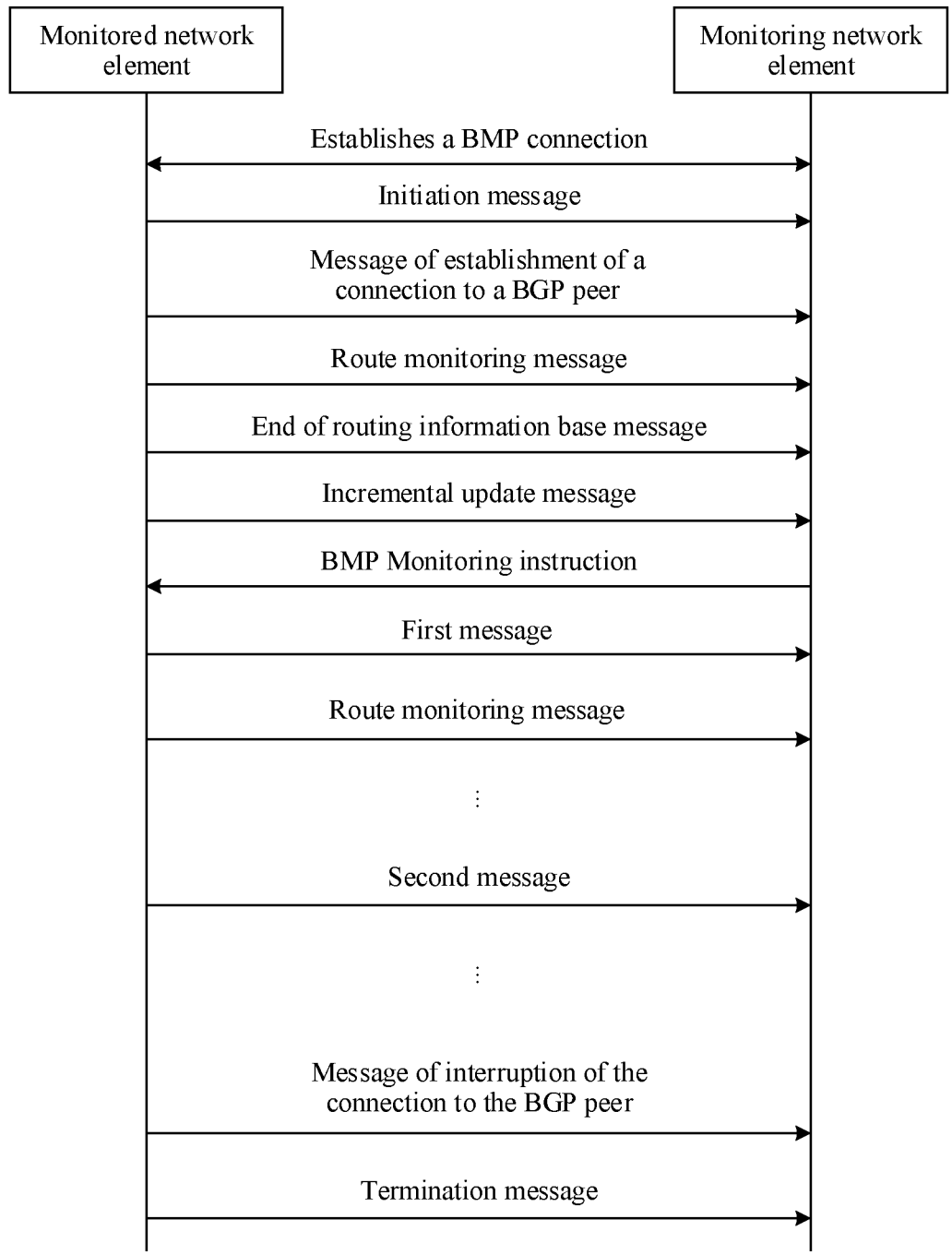
FIG. 19 is a schematic diagram of interaction between a monitoring network element and a monitored network element according to an example embodiment of this application.

In addition, as shown in FIG. 19, a schematic diagram of sending all BMP messages between a monitored network element and a monitoring network element and a schematic diagram of sending a BMP monitoring instruction are further provided.

In this embodiment of this application, the monitoring network element may actively initiate route information synchronization, so that when the monitoring network element needs to synchronize BGP route information, it is more convenient for the monitoring network element to synchronize the BGP route information.

Figure 20:
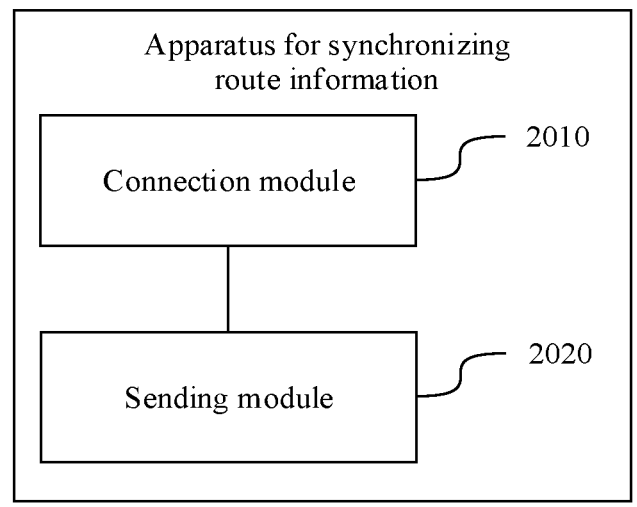
FIG. 20 is a schematic diagram of a structure of an information synchronization apparatus according to an example embodiment of this application.

FIG. 20 is a diagram of a structure of an apparatus for updating route information according to an embodiment of this application. The apparatus may be implemented as a part of the apparatus or the entire apparatus by using software, hardware, or a combination thereof. The apparatus provided in this embodiment of this application may implement the procedures described in FIG. 5, FIG. 7, and FIG. 9 in embodiments of this application. The apparatus includes a connection module 2010 and a sending module 2020.

The connection module 2010 is configured to establish a BMP connection to a monitoring network element, and may be further configured to implement a connection function in step 501 and implicit steps included in step 501, or configured to implement a connection function in step 701 and implicit steps included in step 701, or configured to implement a connection function in step 901 and implicit steps included in step 901.

The sending module 2020 is configured to send a first message to the monitoring network element when detecting a synchronization requirement of BGP route information, where the first message is used to indicate the monitoring network element to update a BGP route information set, and the BGP route information set includes at least one piece of BGP route information. The first message is further used to indicate an update set, and the update set is used to update the BGP route information set. The sending module 2020 may be further configured to implement a sending function of step 502 and implicit steps included in step 502, or configured to implement a sending function of step 702 and implicit steps included in step 702, or configured to implement a sending function of step 902 and implicit steps included in step 902.

In a possible implementation, the update set includes at least one piece of BGP route information, or the update set is empty.

In a possible implementation, the sending module 2020 is further configured to send at least one route monitoring message to the monitoring network element, where BGP route information included in the at least one piece of route monitoring information is used to form the update set.

In a possible implementation, that the first message is further used to indicate an update set includes the first message is further used to indicate a start point of the update set.

The sending module 2020 is further configured to, after sending the at least one route monitoring message to the monitoring network element, send a second message to the monitoring network element, where the second message is used to indicate an end point of the update set.

In a possible implementation, the first message includes a BGP peer address, an address family identifier, and a subsequent address family identifier.

The BGP route information set is determined based on the BGP peer address, the address family identifier, and the subsequent address family identifier.

In a possible implementation, the first message further includes a target route information type, and the target route information type is used to indicate one or more route information types in one or more route information types indicated by the address family identifier and the subsequent address family identifier.

The BGP route information set is determined based on the BGP peer address, the address family identifier, the subsequent address family identifier, and the target route information type.

In a possible implementation, the first message further includes a route policy identifier of each route information type in the target route information type, and the route policy identifier is used to indicate a manner of selecting BGP route information included in the at least one route monitoring message. The BGP route information set is determined based on the BGP peer address, the address family identifier, the subsequent address family identifier, the target route information type, and the route policy identifier of each route information type.

In a possible implementation, the first message further includes a priority of each route information type in the target route information type. The BGP route information set is determined based on the BGP peer address, the address family identifier, the subsequent address family identifier, the target route information type, and the priority of each route information type.

In a possible implementation, the sending module 2020 is configured to, when receiving a BMP monitoring instruction sent by the monitoring network element, determine that the synchronization requirement of the BGP route information is detected, and send the first message to the monitoring network element.

In a possible implementation, the BMP monitoring instruction includes the BGP peer address, the address family identifier, and the subsequent address family identifier.

Figure 21:
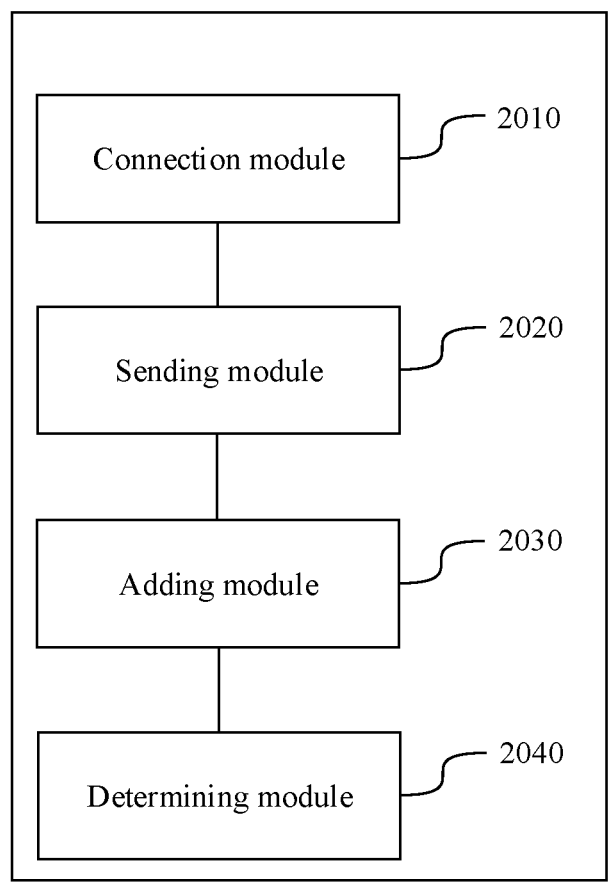
FIG. 21 is a schematic diagram of a structure of an information synchronization apparatus according to an example embodiment of this application.

As shown in FIG. 21, the apparatus further includes an adding module 2030 configured to add the BGP peer address, the address family identifier, and the subsequent address family identifier that are included in the BMP monitoring instruction to the first message, and a determining module 2040 configured to determine the BGP route information included in the at least one route monitoring message based on the BGP peer address, the address family identifier, and the subsequent address family identifier that are included in the BMP monitoring instruction.

In a possible implementation, the BMP monitoring instruction further includes the target route information type, and the target route information type included in the BMP monitoring instruction is used to indicate one or more route information types in one or more route information types indicated by the address family identifier and the subsequent address family identifier included in the BMP monitoring instruction.

The adding module 2030 is further configured to add, to the first message, the target route information type included in the BMP monitoring instruction.

The determining module 2040 is configured to determine the BGP route information included in the at least one route monitoring message based on the BGP peer address, the address family identifier, the subsequent address family identifier, and the target route information type that are included in the BMP monitoring instruction.

In a possible implementation, the BMP monitoring instruction further includes a route policy identifier of each route information type in the target route information type, and the route policy identifier is used to indicate a manner of selecting the BGP route information included in the at least one route monitoring message.

The adding module 2030 is further configured to add, to the first message, the route policy identifier of each route information type included in the BMP monitoring instruction.

The determining module 2040 is configured to determine the BGP route information included in the at least one route monitoring message based on the BGP peer address, the address family identifier, the subsequent address family identifier, the target route information type, and the route policy identifier of each route information type that are included in the BMP monitoring instruction.

In a possible implementation, the BMP monitoring instruction further includes a priority of each route information type in the target route information type.

The adding module 2030 is further configured to add, to the first message, the priority of each route information type included in the BMP monitoring instruction.

The determining module 2040 is configured to determine the BGP route information included in the at least one route monitoring message based on the BGP peer address, the address family identifier, the subsequent address family identifier, the target route information type, and the priority of each route information type that are included in the BMP monitoring instruction.

Figure 22:
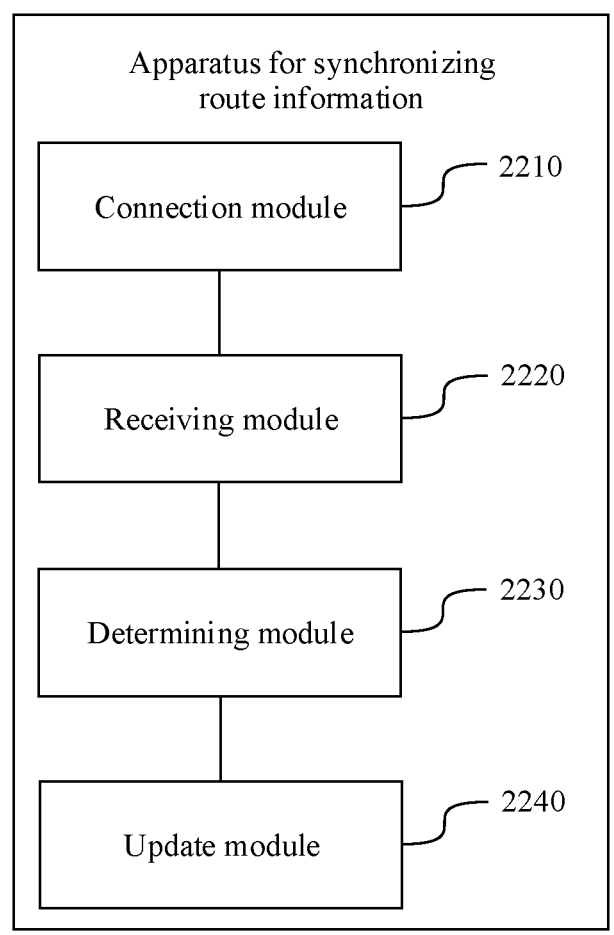
FIG. 22 is a schematic diagram of a structure of an information synchronization apparatus according to an example embodiment of this application.

FIG. 22 is a diagram of a structure of an apparatus for updating route information according to an embodiment of this application. The apparatus may be implemented as a part of the apparatus or the entire apparatus by using software, hardware, or a combination thereof. The apparatus provided in this embodiment of this application may implement the procedures described in FIG. 6, FIG. 8, and FIG. 10 in embodiments of this application. The apparatus includes a connection module 2210, a receiving module 2220, a determining module 2230, and an updating module 2240.

The connection module 2210 is configured to establish a BMP connection to a monitored network element, and may be further configured to implement a connection function in step 601 and implicit steps included in step 601, or configured to implement a connection function in step 801 and implicit steps included in step 801, or configured to implement a connection function in step 1001 and implicit steps included in step 1001.

The receiving module 2220 is configured to receive a first message sent by the monitored network element, where the first message is used to indicate a monitoring network element to update a BGP route information set, and the BGP route information set includes at least one piece of BGP route information. The receiving module 2220 may be further configured to implement a receiving function of step 602 and implicit steps included in step 602, or configured to implement a receiving function of step 801 and implicit steps included in step 802, or configured to implement a receiving function of step 1002 and implicit steps included in step 1002.

The determining module 2230 is configured to determine an update set based on the first message, and may be further configured to implement a determining function in step 603 and implicit steps included in step 603, or configured to implement a determining function in step 804 and implicit steps included in step 804, or configured to implement a determining function of step 1005 and implicit steps included in step 1005.

The updating module 2240 is configured to perform update processing on the BGP route information set based on the update set, and may be further configured to implement an update function in step 604 and implicit steps included in step 604, or configured to implement an update function in step 804 and implicit steps included in step 804, or configured to implement an update function of step 1006 and implicit steps included in step 1006.

In a possible implementation, the receiving module 2220 is further configured to receive at least one route monitoring message sent by the monitored network element, where BGP route information included in the at least one piece of route monitoring information is used to form the update set.

In a possible implementation, the determining module 2230 is configured to determine a start point of the update set based on the first message.

The receiving module 2220 is further configured to receive a second message sent by the monitored network element, where the second message is used to indicate an end point of the update set.

The determining module 2230 is further configured to determine an end point of the update set based on the second message.

Figure 23:
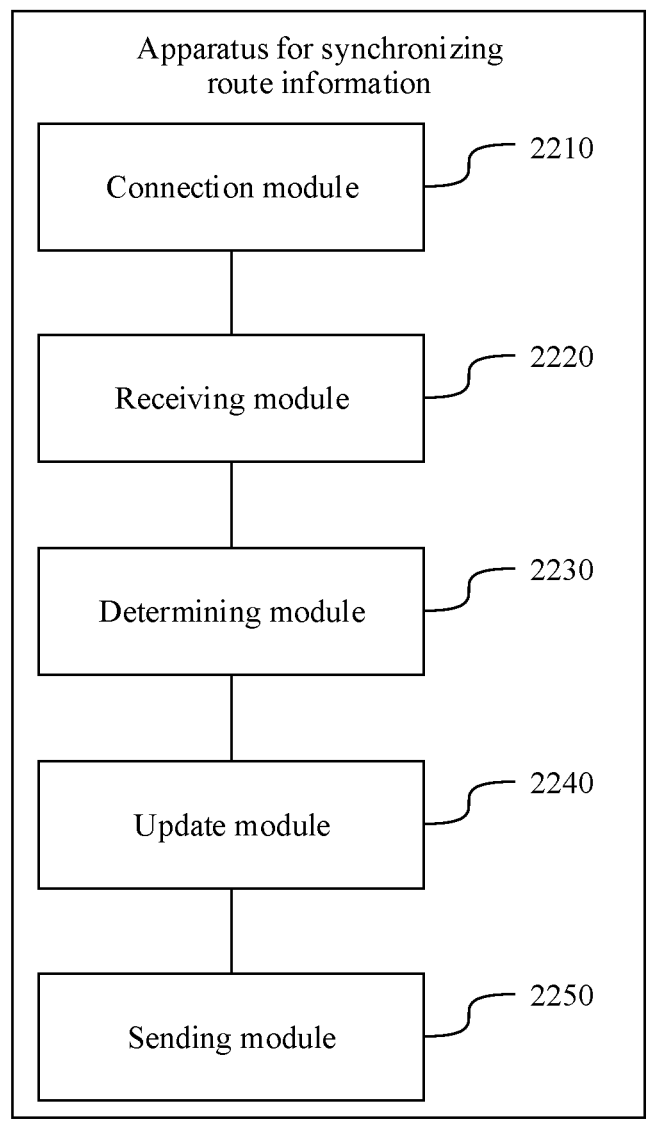
FIG. 23 is a schematic diagram of a structure of an information synchronization apparatus according to an example embodiment of this application.

In a possible implementation, as shown in FIG. 23, the apparatus further includes a sending module 2250 configured to send a BMP monitoring instruction to the monitored network element, where the BMP monitoring instruction is used to indicate that the monitored network element detects a synchronization requirement of the BGP route information.

In a possible implementation, the determining module 2230 is further configured to determine a BGP peer address, an address family identifier, and a subsequent address family identifier based on specified BGP route information uploaded by the monitored network element, and add the BGP peer address, the address family identifier, and the subsequent address family identifier to the BMP monitoring instruction.

In a possible implementation, the determining module 2230 is further configured to determine a target route information type based on the specified BGP route information uploaded by the monitored network element, where the target route information type is used to indicate one or more route information types in one or more route information types indicated by the address family identifier and the subsequent address family identifier, and add the target route information type to the BMP monitoring instruction.

In a possible implementation, the determining module 2230 is further configured to determine, based on the specified BGP route information uploaded by the monitored network element, a route policy identifier corresponding to each route information type in the target route information type, and adding the route policy identifier corresponding to each route information type to the BMP monitoring instruction, and/or determine, based on the specified BGP route information uploaded by the monitored network element, a priority corresponding to each route information type in the target route information type, and adding the priority of each route information type to the BMP monitoring instruction.

In a possible implementation, the first message includes the BGP peer address, the address family identifier, and the subsequent address family identifier.

The determining module 2230 is further configured to, before performing update processing on the BGP route information set based on the update set, determine the BGP route information set based on the BGP peer address, the address family identifier, and the subsequent address family identifier that are included in the first message.

In a possible implementation, the first message further includes a target route information type, and the target route information type is used to indicate one or more route information types in one or more route information types indicated by the address family identifier and the subsequent address family identifier.

The determining module 2230 is further configured to determine the BGP route information set based on the BGP peer address, the address family identifier, the subsequent address family identifier, and the target route information type that are included in the first message.

In a possible implementation, the first message further includes a priority of each route information type in the target route information type.

The updating module 2240 is configured to perform update processing on the BGP route information set based on BGP route information included in the update set and the priority of each route information type, where update time of BGP route information of a high-priority route information type is earlier than that of BGP route information of a low-priority route information type.

In a possible implementation, the first message further includes a route policy identifier of each route information type in the target route information type.

The determining module 2230 is further configured to determine the BGP route information set based on the BGP peer address, the address family identifier, the subsequent address family identifier, the target route information type, and the route policy identifier of each route information type that are included in the first message.

In a possible implementation, the updating module 2240 is configured to, after receiving the second message sent by the monitored network element, perform deletion processing on the BGP route information set, and store the BGP route information included in the update set, after receiving the second message sent by the monitored network element, mark the BGP route information set as unavailable route information, and store the BGP route information included in the update set, after receiving the second message sent by the monitored network element, mark BGP route information that is in the BGP route information set and that does not exist in the update set as unavailable route information or perform deletion processing, and store the BGP route information that is in the update set and that does not exist in the BGP route information set, or before receiving the second message sent by the monitored network element, store BGP route information that is in the update set and that does not exist in the BGP route information set, and after receiving the second message sent by the monitored network element, mark the BGP route information that is in the BGP route information set and that does not exist in the update set as unavailable route information or perform deletion processing.

Division into the modules in embodiments of this application is an example, and is merely logical function division and may alternatively be other division during actual implementation. In addition, functional modules in embodiments of this application may be integrated into a processor, or each of the modules may exist alone physically, or two or more modules are integrated into a module. The integrated module may be implemented in a form of hardware, or may be implemented in a form of a software functional module.

All or some of the foregoing embodiments may be implemented by using software, hardware, firmware, or any combination thereof. When the software is used for implementation, all or some of embodiments may be implemented in a form of a computer program product. The computer program product includes one or more computer instructions. When the computer program instructions are loaded and executed on a server or a terminal, all or some of the processes or functions according to embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive).

What is claimed is:

1. A monitored network element comprising:
   a processor; and
   a memory coupled to the processor and configured to store instructions that, when executed by the processor, cause the monitored network element to:
      establish a Border Gateway Protocol (BGP) Monitoring Protocol (BMP) connection to a monitoring network element;
      send a first message to the monitoring network element when detecting a synchronization requirement of BGP route information, wherein the first message instructs the monitoring network element to update a BGP route information set, wherein the BGP route information set comprises at least one piece of the BGP route information, wherein the first message indicates a start point of an update set, and wherein the update set updates the BGP route information set; and
      send, to the monitoring network element, a second message indicating an end point of the update set.

2. The monitored network element of claim 1, wherein when executed by the processor, the instructions further cause the monitored network element to send at least one route monitoring message to the monitoring network element, and wherein the BGP route information comprised in the at least one route monitoring message forms the update set.

3. The monitored network element of claim 1, wherein the first message comprises a BGP peer address, an address family identifier, and a subsequent address family identifier, and wherein the BGP route information set is based on the BGP peer address, the address family identifier, and the subsequent address family identifier.

4. The monitored network element of claim 3, wherein the first message further comprises a target route information type indicating one or more first route information types in one or more second route information types indicated by the address family identifier and the subsequent address family identifier, and wherein the BGP route information set is further based on the target route information type.

5. The monitored network element of claim 4, wherein the first message further comprises a route policy identifier of each third route information type in the target route information type, wherein the route policy identifier indicates a manner of selecting the BGP route information comprised in at least one route monitoring message, and wherein the BGP route information set is further based on the route policy identifier.

6. The monitored network element of claim 4, wherein the first message further comprises a priority of each third route information type in the target route information type, and wherein the BGP route information set is further based on the priority.

7. The monitored network element of claim 1, wherein when executed by the processor, the instructions further cause the monitored network element to detect the synchronization requirement when receiving a BMP monitoring instruction from the monitoring network element.

8. The monitored network element of claim 7, wherein the BMP monitoring instruction comprises a BGP peer address, an address family identifier, and a subsequent address family identifier, and wherein when executed by the processor, the instructions further cause the monitored network element to:
 add the BGP peer address, the address family identifier, and the subsequent address family identifier to the first message; and
 determine the BGP route information based on the BGP peer address, the address family identifier, and the subsequent address family identifier.

9. The monitored network element of claim 8, wherein the BMP monitoring instruction further comprises a target route information type indicating one or more first route information types in one or more second route information types indicated by the address family identifier and the subsequent address family identifier, and wherein when executed by the processor, the instructions further cause the monitored network element to:
 add the target route information type to the first message; and
 further determine the BGP route information based on the target route information type.

10. The monitored network element of claim 9, wherein the BMP monitoring instruction further comprises a route policy identifier of each third route information type in the target route information type, wherein the route policy identifier indicates a manner of selecting the BGP route information, and wherein when executed by the processor, the instructions further cause the monitored network element to:
 add the route policy identifier to the first message; and
 further determine the BGP route information based on the route policy identifier.

11. The monitored network element of claim 9, wherein the BMP monitoring instruction further comprises a priority of each third route information type in the target route information type, and wherein when executed by the processor, the instructions further cause the monitored network element to:
 add the priority to the first message; and
 further determine the BGP route information based on the priority.

12. A monitoring network element comprising:
 a processor; and
 a memory coupled to the processor and configured to store instructions, wherein when executed by the processor the instructions cause the monitoring network element to:
  establish a Border Gateway Protocol (BGP) Monitoring Protocol (BMP) connection to a monitored network element;
  receive, from the monitored network element, a first message instructing the monitoring network element to update a BGP route information set, wherein the BGP route information set comprises at least one piece of BGP route information, and wherein the first message indicates a start point of an update set for updating the BGP route information set;
  receive, from the monitored network element, a second message indicating an end point of the update set;
  obtain the update set based on the first message; and
  perform update processing on the BGP route information set based on the update set.

13. The monitoring network element of claim 12, wherein when executed by the processor, the instructions further cause the monitoring network element to receive, from the monitored network element, at least one route monitoring message, and wherein the BGP route information comprised in the at least one route monitoring message forms the update set.

14. A network system comprising:
 a monitoring network element; and
 a monitored network element configured to:
  establish a Border Gateway Protocol (BGP) Monitoring Protocol (BMP) connection to the monitoring network element;
  send a first message to the monitoring network element when detecting a synchronization requirement of BGP route information, wherein the first message instructs the monitoring network element to update a BGP route information set comprising at least one piece of the BGP route information, wherein the first message indicates a start point of an update set, and wherein the update set updates the BGP route information set; and
  send a second message to the monitoring network element that indicates an end point of the update set.

15. The network system of claim 14, wherein the monitored network element is further configured to send at least one route monitoring message to the monitoring network element, and wherein the BGP route information comprised in the at least one route monitoring message forms the update set.

16. The network system of claim 14, wherein the first message comprises a BGP peer address, an address family identifier, and a subsequent address family identifier, and wherein the BGP route information set is based on the BGP peer address, the address family identifier, and the subsequent address family identifier.

17. The network system of claim 16, wherein the first message further comprises a target route information type indicating one or more first route information types in one or more second route information types indicated by the address family identifier and the subsequent address family identifier, and wherein the BGP route information set is further based on the target route information type.

18. The network system of claim 17, wherein the first message further comprises a route policy identifier of each third route information type in the target route information type, wherein the route policy identifier indicates a manner of selecting the BGP route information comprised in at least one route monitoring message, and wherein the BGP route information set is further based on the route policy identifier.

19. The network system of claim 17, wherein the first message further comprises a priority of each third route information type in the target route information type, and wherein the BGP route information set is further based on the priority.

20. The network system of claim 14, wherein the monitored network element is further configured to detect the synchronization requirement when receiving a BMP monitoring instruction from the monitoring network element.

\* \* \* \* \*